(12) United States Patent
Lin

(10) Patent No.: US 6,306,204 B1
(45) Date of Patent: Oct. 23, 2001

(54) INK JET INK COMPOSITIONS AND PRINTING PROCESSES

(75) Inventor: John Wei-Ping Lin, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/449,211

(22) Filed: Nov. 24, 1999

(51) Int. Cl.$^7$ ........................................... C09D 11/02
(52) U.S. Cl. ........................ 106/31.43; 106/31.58; 106/31.75; 106/31.86; 106/31.59; 106/31.89
(58) Field of Search .................... 106/31.43, 31.58, 106/31.59, 31.75, 31.86, 31.89

(56) References Cited

U.S. PATENT DOCUMENTS

| | | | |
|---|---|---|---|
| 3,948,668 | * 4/1976 | Hayek et al. | 106/31.59 |
| 4,327,174 | 4/1982 | Von Meer | 430/530 |
| 4,985,710 | 1/1991 | Drake et al. | 346/1.1 |
| 5,019,166 | 5/1991 | Schwarz | 106/31.59 |
| 5,057,854 | 10/1991 | Pond et al. | 346/140 R |
| 5,098,503 | 3/1992 | Drake | 156/299 |
| 5,145,518 | 9/1992 | Winnik et al. | 106/31.15 |
| 5,192,959 | 3/1993 | Drake et al. | 346/140 R |
| 5,198,023 | 3/1993 | Stoffel | 106/31.27 |
| 5,220,346 | 6/1993 | Carreira et al. | 346/1.1 |
| 5,281,261 | 1/1994 | Lin | 106/31.6 |
| 5,356,464 | 10/1994 | Hickman et al. | 106/31.58 |
| 5,371,531 | 12/1994 | Rezanka et al. | 347/43 |
| 5,401,303 | 3/1995 | Stoffel et al. | 106/31.43 |
| 5,432,539 | 7/1995 | Anderson | 347/33 |
| 5,488,402 | 1/1996 | Shields et al. | 347/96 |
| 5,518,534 | 5/1996 | Pearlstine et al. | 106/31.6 |
| 5,531,818 | 7/1996 | Lin et al. | 106/31.28 |
| 5,570,118 | 10/1996 | Rezanka et al. | 347/43 |
| 5,693,129 | 12/1997 | Lin | 106/31.43 |
| 5,766,325 | * 6/1998 | Gundlach et al. | 106/31.43 |
| 5,766,326 | * 6/1998 | Gundlach et al. | 106/31.47 |
| 5,769,929 | * 6/1998 | Gundlach et al. | 106/31.27 |
| 5,772,743 | * 6/1998 | Gundlach et al. | 106/31.27 |
| 5,772,744 | * 6/1998 | Gundlach et al. | 106/31.43 |
| 5,776,230 | * 7/1998 | Gundlach et al. | 106/31.43 |
| 5,788,750 | * 8/1998 | Gundlach et al. | 106/31.27 |
| 5,810,916 | * 9/1998 | Gundlach et al. | 106/31.49 |
| 5,851,274 | 12/1998 | Lin | 106/31.43 |
| 5,855,656 | * 1/1999 | Gundlach et al. | 106/31.43 |
| 5,863,320 | * 1/1999 | Breton et al. | 106/31.59 |
| 5,888,285 | * 3/1999 | Gundlach et al. | 106/31.43 |
| 5,900,899 | 5/1999 | Ichizawa et al. | 347/100 |
| 5,919,293 | * 7/1999 | Moffatt et al. | 106/31.57 |
| 6,077,338 | * 6/2000 | Wallstrom | 106/31.6 |

OTHER PUBLICATIONS

STN Registry printout of Fluorad FC 129, including structure, no date available.*

* cited by examiner

Primary Examiner—Helene Klemanski
(74) Attorney, Agent, or Firm—Lahive & Cockfield, LLP

(57) ABSTRACT

The present invention relates to aqueous ink jet ink compositions comprising a water-soluble or ink-compatible anti-intercolor bleed agent. The ink jet ink compositions typically comprise water, a colorant of dye or pigment, or a mixture of dye and pigment, and a water-soluble or ink-compatible anti-intercolor bleed agent. In one embodiment the water-soluble or ink-compatible intercolor bleed agents of the invention comprise glycine materials with or without a fluorine atom and are represented by formula (I) in either ionic or nonionic forms, particularly those of fluorinated glycine salts with high fluorine content. The water-soluble or ink-compatible anti-intercolor bleed agent in an ink jet composition is believed to accelerate ink drying and to form hydrophobic layers on a print substrate near the image boundary in an ink jet printing process, thus minimizing undesired mixing of different neighboring inks resulting in a reduction of intercolor bleed. The ink jet ink compositions of the present invention exhibit reduced drying time, intercolor bleeding, and image defect as well as providing uniform ink image on transparencies. The ink jet ink compositions comprising the water-soluble or ink-compatible anti-intercolor bleed agents can be used in a multi-color ink jet printing process to obtain multi-color ink jet images at a high speed.

29 Claims, No Drawings

INK JET INK COMPOSITIONS AND PRINTING PROCESSES

BACKGROUND OF THE INVENTION

The present disclosure relates to ink compositions containing an additive and printing processes. More specifically, the present invention relates to aqueous ink compositions comprising a water-compatible or ink-compatible anti-intercolor bleed agent. The inks typically comprise at least water and a colorant of a dye or a pigment or a mixture of dye and pigment. In one embodiment the anti-intercolor bleed agent of the invention comprises a glycine material, particularly fluorinated glycine composition, more particularly a fluoroalkyl glycine salt with high fluorine content. The ink jet ink compositions of the present invention are particularly suitable for ink jet printing processes.

Ink jet printing is a non-impact printing method that produces droplets of ink that are deposited on a substrate such as paper or transparent film in response to an electronic digital signal. Non-impact printing methods (systems) include drop-on-demand ink jet printing and continuous-stream ink jet printing. Drop-on-demand ink jet printing processes include thermal ink jet printing processes, acoustic ink jet printing processes, and piezoelectric ink jet printing processes. Thermal or bubble jet drop-on-demand ink jet printers and piezoelectric ink jet printers have found broad application as output for personal computers in the office and in the home.

In existing thermal ink jet printing processes, the printhead typically comprises one or more ink jet ejectors, each ejector including a channel communicating with an ink supply chamber, or manifold, at one end and having an opening at the opposite end, referred to as a nozzle. A thermal energy generator, usually a resistor, is located in each of the channels, at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation of the bulging ink from the nozzle as a droplet. The acceleration of the ink out of the nozzle while the bubble is growing provides the momentum and velocity for propelling the droplet in a substantially straight line direction towards a print substrate, such as a piece of paper or transparency. Because the droplet of ink is emitted only when the resistor is actuated, this type of thermal ink jet printing is known as "drop-on-demand" printing. Other types of drop-on-demand ink jet printing include piezoelectric and acoustic ink jet printing. Several drop-on demand ink jet printing processes are described in U.S. Pat. Nos. 5,281,261, 5,693,129, and No. 5,851,274, the disclosures of which are totally incorporated herein by reference.

Continuous-stream ink jet printing is known to print on a substrate by placing ink droplets at desired locations while deflecting ink droplets away from the non-imaging areas. This type of ink jet printing is different from the drop-on-demand method, and is also described in, e.g., U.S. Pat. No. 5,281,261, the disclosure of which is totally incorporated herein by reference.

In an ink jet printing apparatus, the printhead typically comprises a linear array of ejectors. However, for faster ink jet printing, several printheads may be butted together to form a partial-width printhead. The printhead or partial-width printhead is moved relative to the surface of the print substrate, either by moving the print substrate relative to a stationary printhead, or vice-versa, or both. In some types of apparatus, a relatively small printhead moves across a print substrate numerous times in swathes, in order to complete a desired image. A partial image is created with each swath of the printhead movement. This type of ink jet printing is called multi-pass or checkerboard printing process. Ink jet printing processes using the partial-width printhead and checkerboard printing process can improve printing speed and productivity and such processes are incorporated in our invention. Ink jet printers employing the partial-width printhead are called "partial-width" printers.

Alternatively, a printhead (e.g., a full-width printhead or printbar comprising several butted printheads) that consists of an array of ejectors and extends the full width (or any desired length) of the print substrate may be held stationary. An ink may be deposited onto the print substrate one line at a time by the full-width printhead (or partial-width printhead covering a portion of the width of a substrate) as the print substrate passes by, until full-page images are completed. This type of ink jet printing process uses a single pass method and it is carried out in what is usually known as a "full-width array" or "partial-width" printer. When the full-width or partial-width printhead and the print substrate are moved relative to each other, image-wise digital data is used to selectively activate the thermal energy generators in the printhead over time so that the desired image will be created on the print substrate. In a multi-color ink jet printing process several full-width or partial-width printheads are used in a printer to deposit different color inks (e.g., black, cyan, magenta, and yellow inks, as well as other optionally selected inks) onto a print substrate to give full color images. In this so-called "single pass method" the printheads are usually held stationary while the imaging substrate moves by (or move under) the printheads. This type of single pass method often employs the full-width array printheads and different color inks to achieve high-speed ink jet printing for the production of multi-color images on a substrate.

Aqueous inks used in ink jet printing generally have water as a major component. Water has the advantage of being non-toxic, non-combustible and environmentally sound relative to non-aqueous inks, which are largely composed of organic solvents. Water is also an excellent medium for dispersing pigments or dissolving dyes. Water is also used for bubble formation and a propellant for the ink in a thermal ink jet printing process.

In a multi-color ink jet printing process, a phenomenon known as "inter-color bleed" may occur. This effect is described in, e.g., U.S. Pat. No. 5,371,531, the disclosure of which is totally incorporated herein by reference. This phenomenon is the bleed of an ink into another ink of different color resulting in mixing one color portion of the image into another portion of the neighboring image of a different color. This becomes most apparent when a black ink is imaged immediately adjacent to an area printed with a color ink such as cyan, magenta or yellow ink. In such a case, the black ink (usually a slow or medium dry ink which usually exhibits good edges for text and high optical density) will be seen to bleed into the color area or vice versa to create a conspicuous print defect which is called intercolor bleed. In some cases the black ink may generally possess high surface tension, while the color inks are generally fast dry inks with low surface tension. Intercolor bleed can take place quickly once the inks are printed a substrate, e.g., on plain paper or transparency or textile before drying (e.g., before microwave or radiant heating or drying at room temperature). For example, printing a slow dry black ink immediately followed by a color ink (especially a yellow ink before the black ink can completely dry) can show undesired inter-color bleed phenomenon with poor print quality. The intercolor bleed between a black ink and a neighboring yellow ink is especially sensitive to human eyes due to high color contrast. Intercolor bleed between the black ink and cyan or magenta ink as well as the intercolor bleed between two different color inks (e.g. cyan yellow, cyan and magenta, magenta and yellow, etc.) also give poor image quality that is not desirable.

SUMMARY OF THE INVENTION

Aspects of the present invention relate to aqueous ink jet ink compositions comprising a water-soluble or ink-compatible anti-intercolor bleed agent and printing processes. The ink jet ink compositions typically comprise water, at least a colorant of a dye or a pigment or a mixture of dye and pigment, and a water-soluble or ink-compatible anti-intercolor bleed agent.

In an embodiment the water-soluble or ink-compatible anti-intercolor bleed agent of the present invention comprises a fluorinated glycine composition, examples of which include those represented by Formula (I):

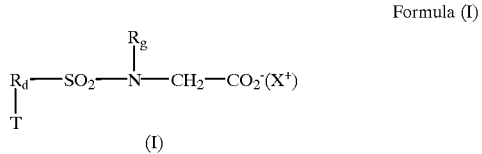

Formula (I)

wherein
a) $R_d$ is independently selected from a $C_1$ to $C_{30}$ alkyl, cyclic alkyl ($C_3$ to $C_{30}$), phenyl, naphthyl, and aromatic group either with or without the presence of a nitrogen or oxygen atom and the required substituent of each carbon atom is selected independently from a hydrogen (H) or a fluorine (F) atom;
b) $R_g$ is independently selected from a $C_1$ to $C_{30}$ alkyl, cyclic alkyl ($C_3$ to $C_{30}$), and aromatic ($\geq C_5$) group either with or without the presence of a nitrogen or oxygen atom and the required substituent of each carbon atom is selected independently from a hydrogen (H) or a fluorine (F) atom;
c) T is selected from a $C_1$ to $C_{30}$ alkyl and cyclic alkyl ($C_3$ to $C_{30}$) group either with or without the presence of a nitrogen or oxygen atom and each required substituent of each carbon atom is selected independently from a hydrogen (H) or a fluorine (F) atom; and
d) and ($X^+$) is a cation selected from a group consisting of a hydrogen cation, a monovalent metal cation including $Li^+$, $Na^+$, $K^+$, $Rb^+$, $Cs^+$, $Fr^+$, and $Ag^+$, a multivalent metal cation such as $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$, etc., and an ammonium group of the general formula (Formula (II))

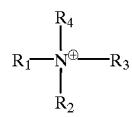

Formula (II)

wherein $R_1$, $R_2$, $R_3$, and $R_4$ are independently selected from hydrogen (e.g., $NH_4+$, $NCH_3H_3^+$, etc.), alkyl group (e.g., methyl, ethyl, propyl, butyl, pentyl, hexyl, etc.), hydroxyalkyl groups (e.g., hydroxyethyl, hydroxypropyl, dhydroxybutyl, etc.), hydroxyl terminated polyalkyleneoxides (e.g. hydroxyl terminated polyethyleneoxide, hydroxyl terminated polypropyleneoxide, hydroxyl terminated poly(ethyleneoxide-co-propyleneoxide) and a group comprising one or more alkyleneoxide moieties terminated with hydrogen, amine, hydroxyl, or alkyl group.

The T, $R_d$ and $R_g$ groups in Formula (I) can be independently selected from groups that are partially or fully substituted by fluorine atom(s) if it is so desired (e.g. groups such as perfluoroalkyl, perfluoro cyclic alkyl, perfluoroaromatic, etc. can be sed). The T, $R_d$ and $R_g$ groups in Formula (I) can also be independently selected from groups that do not have any fluorine atom.

In an embodiment the water-soluble or ink-compatible anti-intercolor bleed gent of Formula (I) comprises a glycine salt containing a N-substituted alkyl group and a N-substituted fluorinated group with high fluorine content, more particularly a glycine salt containing a N-substituted perfluoroalkyl sulfonyl group or a N-substituted fluoroalkyl group. In another embodiment, the water-soluble or ink-compatible anti-intercolor bleed agent comprises N-(fluoroalkyl sulfonyl), N-(alkyl), glycine salts, N-(alkylsulfonyl), N-(fluoroalkyl), glycine salts, N-(fluoroalkyl sulfonyl), N-(fluoroalkyl), glycine salts, and other fluorinated glycine salts as well as esters of fluorinated glycines formed with polyethyleneglycol, or polypropyleneglycol, or poly(ethylene-co-propylene)glycol as well as their glycol derivatives wherein the terminal hydrogen is replaced with an amine or alkyl group.

The materials in formula (I) usually have some solubility either in water (i.e., "water-soluble") or in the ink liquid medium (i.e., "ink-compatible") without causing a problem for the ink. Such materials are water-soluble or ink-compatible anti-intercolor bleed agents of the present invention. The water-soluble or ink-compatible anti-intercolor bleed agents in ink jet ink compositions can facilitate ink drying and may form a hydrophobic layer near the image boundary adjacent to another color ink, thus preventing undesired mixing of different neighboring inks which forms intercolor bleed. The inks of the present invention exhibit reduced drying time, reduced intercolor bleed, and reduced image defect as well as provide a uniform ink image (e.g. solid area) on paper or transparencies. The ink jet inks in some cases are also believed to increase jetting frequency and to provide desired jetting performance and adequate drop mass to form images with high optical density.

The ink jet ink compositions further comprise water and a colorant such as a water soluble or dispersible dye or pigment, or mixture thereof. Desired humectant and ink additives can also be used in the ink jet ink compositions of the present invention to enhance ink physical properties. The ink jet ink compositions can be used in a multi-color ink jet printing process to give high quality images on a substrate with good drying, low inter-color bleed, and without an undesired smearing problem.

The ink jet ink compositions of the present invention may optionally comprise additives such as pH buffering agents, water-soluble monovalent or multivalent cationic acid salts for coupling with a microwave dryer or reduction of bleed, jetting aids, anti-curl agents, ink penetrants, anti-bleed agents, anti-cockle agents, water soluble biocides, polymeric binders, surfactants, pigment dispersants, and other desired additives.

The ink jet inks of the present invention may suitably be prepared as black or color ink jet inks for high quality, high speed, and high resolution (e.g. resolution≧300 spi such as 400 spi, 600 spi, 720 spi, 800 spi, 1200 spi, 1440 spi printheads, etc.) ink jet printing with single, partial-width, or full-width array printheads. The present invention also provides ink jet ink compositions which can have (1) adequate latency in a printer, (2) high frequency response with the ability for high speed ink jet printing, (3) the desired jetting performance of a high resolution ink jet ink printhead, and (4) desired fast drying property and good print quality of images on a substrate, as well as multi-color images with the reduction of (i) intercolor bleeding, (ii) smear, and (iii) paper curl.

In addition, the ink jet ink compositions of this invention are particularly useful for printing high quality multi-color images on a substrate in conjunction with a pigment ink (e.g. carbon black ink) in a multi-color ink jet printer. Different ink printing sequences (e.g. [Yellow (Y), Cyan (C), Magenta (M), and Black (K), YCMK];

YMCK; KMCY; CYMK; MYCK; etc.) can be employed in the multi-color ink jet printing process in which the imaging substrate can be optionally heated before, during, or after the printing as well as combinations thereof. In a particularly advantageous embodiment, ink jet ink compositions are used which comprise a water-soluble or ink-compatible anti-intercolor bleed agent which is an ammonium salt and wherein the imaging substrate is heated before, during, or after printing as well as combinations thereof. Heating the substrate enhances the anti-intercolor bleed properties of the ink jet ink compositions, leading to reduction of intercolor bleed and improved image quality.

Furthermore, the ink jet ink compositions of this invention can be printed by an ink jet printing process (e.g. multi-color ink jet printing process) selected from either a multiple pass method (checkerboard method) or a single pass method for desired printing speed and application. The use of ink jet ink compositions of this invention in a single pass method can greatly increase the capability of printing speed of an ink jet printer.

In another embodiment, the ink jet ink compositions are used in one or more high resolution printhead (resolution ≧300 spi; 400 spi, 600 spi, 720 spi, 800 spi, 1200 spi, 1440 spi, etc.) to produce high quality ink jet images with good resolution.

DETAILED DESCRIPTION OF THE INVENTION

The present invention relates to aqueous ink jet ink compositions comprising a water-soluble or ink-compatible anti-intercolor bleed agent. The inks typically comprise water, at least a colorant, e.g., a dye or a pigment (or a mixture thereof), and a water-soluble or ink-compatible anti-intercolor bleed agent. In one embodiment, the water-compatible anti-intercolor bleed agent of the invention comprises a fluorinated composition, more particularly a fluorinated composition with high fluorine content, and more particularly a perfluoroalkyl acid salt.

In one embodiment, the water-soluble or ink-compatible anti-intercolor bleed agent of the present invention comprises a glycine composition either with or without a fluorine atom and the water-soluble or ink-compatible anti-intercolor bleed agent include those represented by Formula (I):

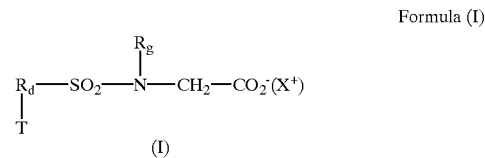

Formula (I)

wherein
a) $R_d$ is independently selected from a $C_1$ to $C_{30}$ alkyl, cyclic alkyl ($C_3$ to $C_{30}$), phenyl, naphthyl, and aromatic group either with or without the presence of a nitrogen or oxygen atom and the required substituent of each carbon atom is selected independently from a hydrogen (H) or a fluorine (F) atom;
b) $R_g$ is independently selected from a $C_1$ to $C_{30}$ alkyl, cyclic alkyl ($C_3$ to $C_{30}$), and aromatic ($\geq C_5$) group either with or without the presence of a nitrogen or oxygen atom and the required substituent of each carbon atom is selected independently from a hydrogen (H) or a fluorine (F) atom;
c) T is selected from a $C_1$ to $C_{30}$ alkyl and cyclic alkyl ($C_3$ to $C_{30}$) group either with or without the presence of a nitrogen or oxygen atom and each required substituent of each carbon atom is selected independently from a hydrogen (H) or a fluorine (F) atom; and
d) ($X^+$) is a cation selected from a group consisting of a hydrogen cation, a monovalent metal cation including $Li^+$, $Na^+$, $K^+$, $Rb^+$, $Cs^+$, $Fr^+$, and $Ag^+$; a multivalent metal cation such as $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, $Co^{++}$, etc.; and an ammonium compound of the general formula (Formula (II))

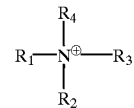

Formula (II)

wherein $R_1$, $R_2$, $R_3$, and $R_4$ are independently selected from hydrogen (e.g. $NH_4^+$, $NCH_3H_3^+$, etc.), alkyl group (e.g., methyl, ethyl, propyl, butyl, pentyl, hexyl, etc.), hydroxyalkyl groups (e.g., hydroxyethyl, hydroxypropyl, dhydroxybutyl, etc.), hydroxyl terminated polyalkyleneoxides (e.g. hydroxyl terminated polyethyleneoxide, hydroxyl terminated polypropyleneoxide, hydroxyl terminated poly (ethyleneoxide-co-propyleneoxide) and a group comprising one or more alkyleneoxide moieties terminated with hydrogen, amine, hydroxyl, or alkyl group.

The T, $R_d$ and $R_g$ groups in Formula (I) can be independently selected from groups consisting of 1). Groups do not have fluorine content, 2). Groups that carbon atoms are partially substituted by fluorine atoms, and 3). Groups that carbon atoms are fully substituted by fluorine atoms, if it is so desired (e.g. groups such as perfluoroalkyl, perfluorocycloalkyl, perfluoroaromatic, etc. can be used).

The materials represented in Formula (I) usually have some solubility either in water (i.e., are water-soluble and can form cations and anions in water) or in the ink liquid medium (e.g., are "ink-compatible" with humectants, penetrants, surfactants, etc.) Such materials are water-soluble or ink-compatible anti-intercolor bleed agents of the ink jet ink compositions the present invention. Although the materials in Formula (I) are represented in the ionic forms (—CO$_2$—X$^+$ comprising anions (—CO$_2$—) and cations (X$^+$) as shown) which can exist in an aqueous ink medium, they also mean to include all the aforementioned materials in their corresponding nonionic forms in this invention (in Formula (I), wherein —CO$_2$ group replaces —CO$_2$—group and there is no negative charge on the carboxylate group and X replaces X$^+$ and is a metal or ammonium group defined in Formula (I) without positive charge(s)), namely —CO$_2$X). For all practical purposes, the ionic forms of the materials in formula (I) are considered to be the same as their corresponding materials in the nonionic forms throughout the entire present invention including the claims. The aforementioned nonionic form of the glycine compounds including those glycine acids and salts (either with or without a fluorine atom) can have some solubility in ink jet ink compositions which may also comprise their favorable or compatible humectants, penetrants, dispersants, wetting agents, surfactants, drying accelerating agents, and ink ingredients. These materials of Formula (I) represented in nonionic forms are also water-soluble or ink-compatible anti-intercolor bleed agents of this invention. The aforementioned materials in formula (I) either in the ionic or nonionic form are included in water-soluble or ink-compatible anti-intercolor bleed agents of the present invention.

In an embodiment the water-soluble or ink-compatible anti-intercolor bleed agents of Formula (I) may comprise a glycine salt containing a N-substituted alkyl group and a N-substituted fluorinated alkyl group with high fluorine content, more particularly a glycine salt containing a N-substituted perfluoroalkyl sulfonyl group or a N-substituted fluoroalkyl group. In another embodiment the water-soluble or ink-compatible anti-intercolor bleed agent comprises a material selected from a group consisting of N-(fluoroalkyl sulfonyl), N-(alkyl), glycine salts; N-(fluorocycloalkyl sulfonyl), N-(alkyl), glycine salts; N-(alkylsulfonyl), N-(fluoroalkyl), glycine salts; N-(cycloalkylsulfonyl), N-(fluoroalkyl), glycine salts; N-(fluoroalkyl sulfonyl), N-(fluoroalkyl), glycine salts; N-(fluorocycloalkyl sulfonyl), N-(fluoroalkyl), glycine salts; N-(fluoroalkyl sulfonyl), N-(fluorocycloalkyl), glycine salts; and other fluorinated glycine salts; as well as esters of fluorinated glycines formed with ethyleneglycol, propyleneglycol, polyethyleneglycol, or polypropyleneglycol, or poly(ethylene-co-propylene)glycol.

Examples of fluorinated glycine salts of the invention represented by Formula (I) include, but are not limited to, Glycine, N-methyl-N-[(heptadecafluorooctyl)sulfonyl]-, salts; Glycine, N-ethyl-N-[(heptadecafluorooctyl)sulfonyl]-, salts; Glycine, N-cyclohexyl-N-[(heptadecafluorooctyl)sulfonyl]-, salts; Glycine, N-ethyl-N-[(tridecafluorohexyl)sulfonyl]-, salts; Glycine, N-propyl-N-[(tridecafluorohexyl)sulfonyl]-, salts; Glycine, N-ethyl-N-[(nonafluorobutyl)sulfonyl]-, salts; Glycine, N-ethyl-N-[(pentadecafluoroheptyl)sulfonyl]-, salts; Glycine, N-ethyl-N-[(undecafluoropentyl)sulfonyl]-, salts; Glycine, N-pentafluoroethyl-N-[(heptadecafluorooctyl)sulfonyl]-, salts; Glycine, N-pentafluoroethyl-N-[(tridecafluorohexyl)sulfonyl]-, salts; Glycine, N-pentafluoroethyl-N-[(nonafluorobutyl)sulfonyl]-, salts; Glycine, N-pentafluoroethyl-N-[(pentadecafluoroheptyl)sulfonyl]-, salts; Glycine, N-pentafluoroethyl-N-[(undecafluoropentyl)sulfonyl]-, salts; Glycine, N-ethyl-N-[(tridecafluorohexyl)sulfonyl]-, salts; Glycine, N-propyl-N-[(tridecafluorohexyl)sulfonyl]-, salts; Glycine, N-ethyl-N-[(nonafluorobutyl)sulfonyl]-salts; Glycine, N-ethyl-N-[(pentadecafluoroheptyl)sulfonyl]-, salts; Glycine, N-ethyl-N-[(undecafluoropentyl)sulfonyl]-, salts; Glycine, N-pentafluoroethyl -N-[(heptadecafluorooctyl)sulfonyl]-, salts; Glycine, N-pentafluorophenyl-N-[(tridecafluorohexyl)sulfonyl]-, salts; Glycine, N-perfluorotolyl-N-[(nonafluorobutyl)sulfonyl]-, salts; Glycine, N-perfluoroethyl-N-[(pentadecafluoroheptyl)sulfonyl]-, salts; Glycine, N-perfluorohexyl-N-[(perfluoropentyl)sulfonyl]-, salts; Glycine, N-perfluorooctyl-N-[(hexyl)sulfonyl]-, salts; Glycine, N-perfluorooctyl-N-[(perfluorohexyl)sulfonyl]-, salts; Glycine, N-perfluoroethyl-N-[(perfluorocyclohexyl)sulfonyl]-, salts; Glycine, N-perfluorohexyl--[(perfluoroethylcyclopentyl)sulfonyl]-, salts; Glycine, N-perfluorooctyl-N-[(perfluoromethylhexyl)sulfonyl]-, salts; Glycine, N-phenyl-N-[(perfluorohexyl)sulfonyl]-, salts; Glycine, N-(4-methylphenyl)-N-[(perfluorohexyl)sulfonyl]-, salts; isomers of aformentioned materials; and the like; as well as mixtures thereof. The aforementioned glycine salts include metal and ammonium salts. The aforementioned salts can be prepared in the ink manufacturing process or separately by reacting the glycine derivatives (acid forms) with a base comprising the alkali metal or multi-valent metal or amines before their use in preparing the ink jet ink compositions of the present invention.

Examples of fluorinated glycine esters of polyethyleneglycol, polypropyleneglycol, and poly(ethyleneglycol-co-propyleneglycol) represented by Formula (I) include, but are not limited to, polyethyleneglycol ester of N-methyl-N-[(heptadecafluorooctyl)sulfonyl] Glycine; polyethyleneglycol ester of N-ethyl-N-[(heptadecafluorooctyl)sulfonyl]Glycine; polyethyleneglycol ester of N-cyclohexyl-N-[(heptadecafluorooctyl)sulfonyl]Glycine; polypropyleneglycol ester of N-ethyl-N-[(tridecafluorohexyl)sulfonyl]Glycine; polyethyleneglycol ester of N-propyl-N-[(tridecafluorohexyl)sulfonyl]Glycine; poly(ethyleneglycol-co-propyleneglycol) ester of N-ethyl-N-[(nonafluorobutyl)sulfonyl]Glycine; polyethyleneglycol ester of N-ethyl -N-[(pentadecafluoroheptyl)sulfonyl] Glycine; polyethyleneglycol ester of N-ethyl-N-[(undecafluoropentyl)sulfonyl]Glycine; polyethyleneglycol ester of N-pentafluoroethyl-N-[(heptadecafluorooctyl)sulfonyl]Glycine; polyethyleneglycol ester of N-pentafluoroethyl-N-[(tridecafluorohexyl)sulfonyl]Glycine; polyethyleneglycol ester of N-pentafluoroethyl-N-[(nonafluorobutyl)sulfonyl]Glycine; polypropyleneglycol ester of N-pentafluoroethyl-N-[(pentadecafluoroheptyl)sulfonyl]Glycine; polyethyleneglycol ester of N-pentafluoroethyl-N-[(undecafluoropentyl)sulfonyl]Glycine; polyethyleneglycol ester of N-ethyl-N-[(tridecafluorohexyl)sulfonyl]Glycine; polyethyleneglycol ester of N-propyl-N-[(tridecafluorohexyl)sulfonyl]Glycine; polyethyleneglycol ester of N-ethyl-N-[(nonafluorobutyl)sulfonyl]Glycine; polyethyleneglycol ester of N-ethyl-N-[(pentadecafluoroheptyl)sulfonyl]Glycine; polypropyleneglycol ester of N-ethyl-N-[(undecafluoropentyl)sulfonyl]Glycine; polyethyleneglycol ester of N-pentafluoroethyl-N-[(heptadecafluorooctyl)sulfonyl]Glycine; polyethyleneglycol ester of N-pentafluorophenyl-N-[(tridecafluorohexyl)sulfonyl]Glycine; polyethyleneglycol ester of N-perfluorotolyl-N-[(nonafluorobutyl)sulfonyl]Glycine; polyethyleneglycol ester of N-perfluoroethyl-N-[(pentadecafluoroheptyl)sulfonyl]Glycine; polyethyleneglycol ester of N-perfluorohexyl-N-[(perfluoropentyl)sulfonyl]Glycine; polyethyleneglycol ester of N-perfluorooctyl-N-[(hexyl)sulfonyl]Glycine; polyethyleneglycol ester of N-perfluorooctyl-N-[(perfluorohexyl)sulfonyl]Glycine; polyethyleneglycol ester of N-perfluoroethyl-N-[(perfluorocyclohexyl)sulfonyl]Glycine; polyethyleneglycol ester of N-perfluorohexyl-N-[(perfluoroethylcyclopentyl) sulfonyl]Glycine; polyethyleneglycol ester of N-perfluorooctyl-N-[(perfluoromethylhexyl)sulfonyl] Glycine; polyethyleneglycol ester of N-phenyl-N-[(perfluorohexyl)sulfonyl]Glycine; polyethyleneglycol ester of N-(4-methylphenyl)-N-[(perfluorohexyl)sulfonyl] Glycine; isomers of aforementioned materials; and the like, as well as mixtures thereof.

The term "alkyl" includes the saturated aliphatic groups, including straight-chain alkyl groups, branched-chain alkyl groups, cycloalkyl (alicyclic) groups, alkyl substituted cycloalkyl groups, and cycloalkyl substituted alkyl groups. A straight chain or branched chain alkyl group advantageously has about 30 or fewer carbon atoms in its backbone (e.g., $C_1$–$C_{30}$ for straight chain, $C_3$–$C_{30}$ for branched chain), preferably $C_{20}$ or fewer. Likewise, preferred cycloalkyls have from about 3 to about 10 carbon atoms in their ring structure, and more preferably have about 4 to about 8 carbon atoms in the ring structure. The term "lower alkyl" refers to alkyl groups having from about 1 to about 6 carbon atoms in the chain, and to cycloalkyls having from about 3 to about 8 carbon atoms in the ring structure. Similarly lower alkenyl, lower alkoxy, lower alkylthio, lower alkylamino, and lower alkylcarboxyl refer to corresponding functional groups having from about 1 to about 6 carbon atoms in the open chain, and about 3 to about 8 carbon atoms in the ring structure.

Moreover, the term "alkyl" (including long alkyl and "lower alkyl") as used throughout the specification and claims is intended to include both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "arylalkyl" moiety is an alkyl group substituted with an aryl group (e.g., phenylmethyl (benzyl), phenylethyl, etc.).

The term "heterocyclic group" is intended to include closed ring structures in which one or more of the atoms in the ring is an element other than carbon, for example, nitrogen, or oxygen or sulfur. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aromatic group" is intended to include unsaturated cyclic hydrocarbons containing one or more rings. Aromatic groups include 5- and 6- membered single-ring groups, which may include from zero to four heteroatoms, for example, benzene, pyrrole, furan, thiophene, imidazole, oxazole, thiazole, triazole, pyrazole, pyridine, pyrazine, pyridazine and pyrimidine, and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —$CF_3$, —CN, or the like.

The glycine acid salts of the anti-intercolor bleed agents, either with or without a fluorine atom allow the materials to be ionized easily in water to provide the needed water solubility or compatibility in aqueous ink jet inks. Although the materials in formula (I) are represented in the ionic forms (—$CO_2$—$X^+$; anions (—$CO_2$—) and cations ($X^+$) are shown) which can exist in an aqueous medium they also mean to include all the aforementioned materials of Formula (I) in their corresponding nonionic forms (no negative charge on —$CO_2$ group and X is a metal or ammonium group without a positive charge) in this invention. For all practical purpose, the ionic forms of the materials in formula (I) are considered to be the same as their corresponding materials in the nonionic forms throughout the entire present invention including the claims. The aforementioned nonionic form of the glycine compounds including those glycine acids, esters, and salts (either with or without fluorine atom) can have some solubility in ink jet ink compositions, which also comprise their favorable or compatible humectants, penetrants, surfactants, and ink ingredients. These materials are ink-compatible anti-intercolor bleed agents in the ink jet ink compositions of this invention. The materials in Formula (I), especially the fluorinated materials are hydrophobic and capable of providing low surface tension to an ink jet ink composition for the ink to be dried quickly soon after its printing. The fluorinated alkyl or cyclic alkyl groups (Formula (I)) of the anti-intercolor bleed agents in an ink jet ink may also serve as a barrier on a substrate for preventing undesired ink mixing near the border areas between two printing inks. As a result, inter-color bleed between the ink comprising the anti-intercolor bleed agent of this invention and another ink is reduced or minimized. Since the long alkyl and fluorinated functional groups of the anti-intercolor bleed agent in the ink are hydrophobic, the agents can also provide beneficial smear resistance for the printed images.

The acid salts of the anti-intercolor bleed agents allow the materials to be ionized easily in water, especially in the presence of a base, to provide the needed water solubility or compatibility in ink jet ink compositions. The water-soluble or ink-compatible anti-intercolor bleed agents of the invention may be added to ink compositions in an effective amount to prevent or reduce inter-color bleed or smear, e.g., generally in a concentration of from at least 0.1% up to 8% by weight, preferably less than 6%, and more preferably less than 4%.

The water-soluble or ink-compatible anti-intercolor bleed agents of this invention can provide ink jet ink compositions with low surface energy property, good wetting, and fast drying character and also exhibit hydrophobic or autophobic characteristics on substrates (or print substrates) for reducing inter-color bleed and smear.

In an embodiment of the invention, a "first ink" (e.g., a black ink such as a carbon black ink or a color ink) comprising the ink additive of water-soluble or ink-compatible anti-intercolor bleed agent can be used when it is printed on a substrate (with or without being heated) to produce sharp edge acuity next to a "second ink" (e.g., a fast dry color ink such as a yellow (Y), or cyan (C), or magenta (M) ink) which usually has a surface tension of less than 45 dynes/cm. Alternatively, a "first ink" (e.g., a color ink such as a yellow, or cyan, or magenta ink, etc.) comprising a water-soluble or ink-compatible anti-intercolor bleed agent of this invention can also be used when it is printed on a substrate next to a "second ink" (e.g., a black ink such as a carbon black ink or a black dye ink) with sharp edge acuity either with or without heating the substrate. The carbon black ink can comprise either chemically modified carbon black particles (carbon black surface is modified to comprise water ionizable groups such as carboxylate, sulfonate, phosphorate, phosphonate, or ammonium groups) or chemically unmodified carbon black particles (regular carbon black) stabilized by a nonionic, anionic, or cationic dispersant.

In a particularly advantageous embodiment, ink jet ink compositions which comprise a water-soluble or ink-compatible anti-intercolor bleed agent consisting of an ammonium salt are used in an ink jet printing process wherein the imaging substrate is heated in any stage of printing including before, during, or after printing as well as combinations thereof. The ammonium cation is desirably an ammonium group of the general formula (Formula (II))

Formula (II)

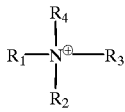

wherein $R_1$, $R_2$, $R_3$, and $R_4$ are independently selected from hydrogen (e.g., $NH_4+$, $NCH_3H_3^+$, etc.), lower alkyl group (e.g., methyl, ethyl, propyl, butyl, pentyl, hexyl, etc.), and lower hydroxyalkyl groups (e.g., hydroxyethyl, hydroxypropyl, hydroxybutyl, etc.), and hydroxyl terminated polyalkyleneoxides (e.g. hydroxyl terminated polyethyleneoxide, hydroxyl terminated polypropyleneoxide, hydroxyl terminated poly (ethyleneoxide-co-propyleneoxide). Desirably, the ammonium group comprises less than about 30 carbon atoms.

Heating the ink jet ink compositions and substrate in the ink jet printing process further enhances the anti-intercolor bleed properties of the ink compositions, leading to improved image quality. Without wishing to be limited by theory, it is believed that ammonium salts of the water-soluble or ink-compatible anti-intercolor agents can be thermally decomposed, either in the thermal ink jet printhead or on a heated print substrate, to give ammonia or amines and the corresponding glycines (in acid form), the latter of which has significantly reduced water solubility or compatibility. The formation of the glycines (in acid form), particularly the fluorinated glycines with reduced water solubility or compatibility onto a print substrate in the ink jet printing process is believed provide an enhanced hydrophobic barrier for the ink near its image boundary with another ink on a substrate (either with or without being heated), thus reducing the chance of undesired mixing of two neighboring inks which can form inter-color bleed. Heating of such an ink jet ink composition (ink) in a printhead or on a substrate is believed to thermally decompose the ammonium salt to give a less water soluble or compatible glycine (in acid form), and form a more hydrophobic barrier near the border areas of two inks, resulting in enhanced reduction of inter-color bleed.

The ink jet ink compositions of the present invention also exhibit reduced drying time possibly due to the hydrophobic nature of the $R_d$, $R_g$, and T groups, and reduced image defects, as well as providing uniform ink image (e.g. solid area image) on transparencies and papers. The hydrophilic acid functional group is believed to interact or react with hydroxyl groups of a substrate (e.g., paper, fibers, etc.), while the more hydrophobic $R_d$, $R_g$, and T groups tend to reside on the surface of the substrate. The ink jet inks of the present invention also can have improved smear resistance and waterfastness.

In an ink jet printing process the "first ink" (e.g., a color ink (C, M, Y) comprising the water-soluble or ink-compatible anti-intercolor bleed agent can be printed first and forms a low surface energy hydrophobic barrier on a substrate after printing. Therefore, the low surface energy hydrophobic barrier can be generated by the materials (Formula (I)) of this invention (e.g. in the "first ink"), especially the fluorinated materials, on the surface of a print substrate and prevents the undesired mixing between the "first ink" and the "second ink" (an ink jet ink with a surface tension of 22–72 dyne/cm, and preferably ≧45 dyne/cm is subsequently printed next to the "first ink") to avoid inter-color bleed. In this case, the "first ink" (any one of color inks, e.g. cyan, magenta, and yellow inks) is printed first followed by the subsequent printing of "second ink" (e.g. a black ink). The "second ink" can be a pigment-based (e.g., carbon black ink) or dye-based ink. As mentioned before, the carbon black ink can comprise either chemically modified carbon black particles (carbon black surface is modified to comprise water ionizable groups such as carboxylic acid salts, sulfonic acid salts, phosphonic acid salts, or ammonium groups) or chemically unmodified carbon black particles (regular carbon black) stabilized by a nonionic, anionic, or cationic dispersant. Any other ink printing orders or sequences can be used to print the "first ink" and the "second ink" as long as the objective is achieved.

In another embodiment of ink jet printing process of the invention, a "first ink" (e.g., a black or color ink of a dye-based or pigment-based ink) comprising the water-soluble or ink-compatible anti-intercolor bleed agent can form a low surface energy hydrophobic barrier on a substrate after it is printed. Therefore, the low surface energy hydrophobic barrier can be generated by the materials of this invention (in the "first ink"), especially the fluorinated materials, on the surface of a print substrate and prevents undesired mixing between the "first ink" and the "second ink" (e.g., an ink such as a cyan, magenta, yellow, and black ink is printed subsequently after the "first ink") to avoid inter-color bleed. In this case, the "first ink" (e.g., the black ink or a color ink) is printed first followed by subsequent printing of a color ink ("second ink") either with or without heating the print substrate.

As described earlier, the water-soluble or ink-compatible anti-intercolor bleed agents can also be employed in a color ink and used in conjunction with either a black ink (black pigment ink (e.g. carbon black ink) or black dye ink) or color ink which may or may not contain the material of this invention to reduce inter-color bleed. In this case, the color ink comprising the water-soluble or ink-compatible anti-intercolor bleed agents of this invention may be preferred to be printed first followed later by a dye-based or a pigment-based black ink (e.g., carbon black ink) or another different color ink. In a multi-color ink jet printing process the printing can be carried out in any desired ink printing sequence (or order) with optionally heated substrate provided the objective of this invention is achieved.

In an embodiment of the invention, a multiple pass printing mode (checkerboard mode) or a single pass ink jet printing process can be employed with any desired ink printing sequence to achieve a desired printing speed. For example, the ink printing sequence can be selected from a group consisting of a) K, C, M, Y; b) K, C, Y, M; c) K, M, C, Y; d) K, M, Y, C; e) K, Y, C, M; f) K, Y, M, C; g) Y, C, M, K; h) Y, M,C, K; i)Y,C,K, M;j) Y, M, K, C; k) Y, K, C, M;l) Y, K, M,C;m) C,Y, M,K;n)C,Y, K, M;o) C,M,Y, K; p) C,M,K,Y; q) C,K,M,Y;r)C, K,Y, M;s)M,Y,C, K;t) M,Y,K, C; u) M, C, Y, K; w) M, C, K, Y; x) M, K, Y, C; and z) M, K, C, Y; wherein one ink must comprise at least one of the water-soluble or ink-compatible anti-intercolor bleed agents to control inter-color bleed. Some of the preferred ink jet printing sequences are cases a), c), g), and h) where the longest time intervals between printing the yellow and the black ink are possible for the reduction of inter-color bleed. The preferred ink printing sequence is selected also because inter-color bleed between the black and yellow images is easier to be detected by eyes due to higher color contrast. Longest time intervals between printing the yellow and the black ink would allow one of them to be adequately dried before the next ink is deposited near to it. Thus, it minimizes possible ink diffusion between them (e.g. black and yellow inks, etc.) on a substrate for the reduction of high contrast inter-color bleed. Ink printing sequences other than the preferred cases were mentioned above which can also be used if necessary. However, there is a possibility that they may be less effective in controlling inter-color bleed.

In another embodiment of the invention, each color ink (e.g. cyan, magenta, and yellow inks) in a multi-color ink jet process can comprise any one of the desired anti-intercolor bleed agents of this invention in a favorable concentration and used to print on a substrate next to a black ink (e.g., a carbon black ink or a black dye ink) which may or may not have an anti-intercolor bleed agent of this invention. Sometimes it is preferred to print a pigment ink (e.g. carbon black ink) along with the color inks in which at least one of them comprises an anti-intercolor bleed agent of this invention in a multi-color ink jet printing process. In this case, the carbon black ink usually is preferred to be able to produce a high quality image (sharp line, text, and graphic) on substrates (plain and coated papers as well as ink jet transparency). The color inks comprising the anti-intercolor bleed agent(s) can quickly penetrate into papers and dry very fast resulting in low inter-color bleed and smear. The carbon black ink in the multi-color ink jet printing process can comprise carbon black particles that are either chemically modified (comprising water ionizable functional groups such as carboxylic acid salts, sulfonic acid salts, phosphonic acid salts, or ammonium groups on the pigment particle surface) or chemically unmodified.

In another embodiment of the invention, any one of the ink jet inks (e.g., cyan, magenta, yellow, black, etc.) in a multi-color ink jet printing process can comprise the water-soluble or ink-compatible anti-intercolor bleed agent of this invention. If necessary, more than one ink or all inks (e.g., black and color inks) can also comprise the water-soluble or ink-compatible anti-intercolor bleed agents in any desired amount in the ink jet ink compositions to reduce intercolor bleed and drying time.

The above ink jet printing processes which use the ink jet ink compositions of the present invention can be carried out either with or without heating the substrate at any stage of ink jet printing process. The substrate can be heated either before, during, or after the printing as well as combinations thereof. Conventional heating methods such as radiant heating, lamp or light heating, microwave heating, heated platen, heated belt, heated drum, and heated roller can be employed. Heating the substrate during printing is particularly useful to produce high quality images with very low or no intercolor bleed, especially when ammonium salts of the water-soluble or ink-compatible anti-intercolor bleed agents of the invention are used, as discussed above.

The water-soluble or ink-compatible anti-intercolor bleed agents can also be used to help ink drying and the formation of uniform image on papers without mottle. Furthermore, it can also help producing good ink jet images on transparencies which sometime can be difficult to obtain.

Ink jet ink compositions of the present invention may also optionally include any of the various known water miscible or soluble organic compounds as humectants or co-solvents. Suitable organic compounds (humectants or co-solvents) include, but are not limited to, glycol derivatives such as ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, polypropylene glycol, and the like; diols such as 1,3-propanediol, 1,4-butanediol, 1,4-petanediol, 1,5-pentanediol, 1,5-hexanediol, and 1,6-hexanediol; triols such as glycerine, trimethylolpropane, 1,3,5-triols including 1,3,5 petanetriol and 1,3,5-hexanetriol, and 1,2,5-triols including 1,2,5 petanetriol and 1,2,5-hexanetriol; reaction products of all aforementioned glycol and triol derivatives with alkylethyleneoxides such as ethyleneoxide and propyleneoxide, and the like; sulfoxide and sulfone derivatives including sulfolane, dimethylsulfone, dimethylsulfoxide, and the like; amides such as 2-pyrrolidinone, N-methylpyrrolidinone, N-hydroxyethylpyrrolidinone, N-hydroxyamides including N-acetylethanolamine, N-acetylpropanolamine, N,N-dimethylforamide, N-methylacetamide, N,N-dimethylacetamide, caprolactam, and the like; urea and its derivatives(ureas); inner salts including betaines; ethers such as glycol ethers including carbitol derivatives such as butylcarbitol, cellusolve, and the like; polyglycolether derivatives; carboxylic acids and salts; alcohols including n-hexanol, n-pentanol, n-butanol, n-propanol, isopropanol, ethanol, methanol, and the like; thio derivatives of the aforementioned hydroxyl containing compounds; amino alcohol derivatives and the like; derivatives and isomers of all the aforementioned materials; and their mixtures thereof. Many other known humectants in the art of ink jet inks can also be employed.

The ink jet ink compositions of the present invention include both fast drying and slow drying inks (inks with surface tension of 22–72 dyne/cm). The slow drying inks generally have a surface tension which is equal to or greater than 45 dynes/cm, while fast drying inks generally have a surface tension less than 45 dynes/cm. The slow drying inks tend to give good edges and sharp images on plain papers with a slow printing speed. The fast drying inks are capable of printing at a fast speed but with a slightly inferior print quality. Fast drying inks can comprise a penetrant that will increase ink-drying speed. The penetrant gives the fast drying ink a lower surface tension, usually less than about 45 dynes/cm and preferably less than about 40 dynes/cm. Preferably, the fast drying ink jet inks have a surface tension of from about 22 to about 45 dynes/cm, and more preferably from about 22 to about 40 dynes/cm. The viscosity of the inks at 25° C. is usually less than about 20 cps (centipoises), preferably from about 1 cp. to about 10 cps, and more preferably from about 1 cp. to about 5 cps.

Penetrants suitable for use in the present invention include, but are not limited to, hydroxyether derivatives, including alkylcellusolves, propyleneglycol butyl ether, dipropyleneglycol butyl ether, tripropyleneglycol methyl ether, and the like; alkylcarbitols such as hexylcarbitol, butylcarbitol and the like; polyethyleneglycol ether derivatives (e.g., one or two hydroxyl group(s) of polyethyleneglycol is (or are) replaced by a functional group such as methyl, ethyl, propyl, butyl, pentyl, hexyl, dodecyl, lauryl, stearyl, phenyl, and alyklphenyl (e.g., octylphenyl, nonylphenyl and the like)); and polypropyleneglycol ether derivatives (e.g., one or two hydroxyl group(s) of polyethyleneglycol is (or are) replaced by a functional group such as methyl, ethyl, propyl, butyl, pentyl, hexyl, dodecyl, lauryl, stearyl, phenyl, and alyklphenyl); alcohol derivatives (e.g., methanol, ethanol, isopropanol, butanol, pantanol, hexanol, octanol, and the like as well as their isomers); alkyl and cyclic amide derivatives including hexanoic acid amide, octanoic acid amide, N-cyclohexylpyrrolidinone, N-hexylpyrrolidinone, N-ethylpyrrolidinone, and the like; various surfactants having hydrophobic and hydrophilic moieties in the molecule including nonionic, cationic, and anionic types surfactants; and mixtures thereof.

The ink jet ink compositions of the present invention also can comprise a colorant of dyes or pigments, or mixtures of dye and pigment. The colorant can be selected from any of the suitable colorants known in the art which are either an anionic or cationic dye or a pigment. The pigment may be present with or without a dispersing agent. For example, chemically modified pigments that have water compatible or ionized functional group(s) such as anionic carboxylate, phosphonate group, and sulfonate group(s) as well as cationic ammonium group(s) can be dispersed in aqueous inks without a dispersing agent. If it is desired, the chemically modified pigments can also be used in conjunction with a pigment dispersant to further enhance ink stability. Some chemically modified pigment particles were disclosed in U.S. Pat. No. 5,281,261, the disclosure of which is totally incorporated herein for reference. Some commercially available pigment dispersions that comprise chemically modified pigments (e.g. chemically modified carbon black) include, but not limited to, Cab-O-Jet® carbon black dispersions from Cabot Chemical Co. and Bonjet® carbon black dispersions from Orient Chemical Co. of Japan. Those chemically modified pigment dispersions can be employed in ink jet compositions of the present invention. In addition, the colorant may, in embodiments, be a mixture of one or more pigments and/or dyes. The colorants comprising the mixed pigments and/or dyes can be used to provide desired color gamut and hue of ink jet images.

In embodiments where dye is used, the dye is present in the ink jet ink in any effective amount to provide desired color strength. Typically the dye (solid dye content) is present in an amount of from about 0 to about 20% by weight of total ink weight, and preferably from about 0.1 to about 10% by weight of total ink weight, although the amount can be outside this range. If a dye solution is used in ink formulations then, higher weight percentage of dye solution is needed in order to give required amount of solid dye content in the ink. A mixture of dyes in the different proportions can be employed to obtain a desired hue or shade. Similarly, in embodiments where pigment is used, the pigment may be present in the ink jet ink in any effective amount to provide needed color strength. Typically the pigment (solid pigment content) is present in an amount of from about 0 to about 15% by weight of total ink weight and preferably from about 0.1 to about 10% by weight of total ink weight, and more preferably from 1 to 8 percent by weight of total ink weight, although the amount can be outside of this range. Where both dyes and pigments are incorporated into the ink jet ink compositions, the weight percentage of the combined colorant may be adjusted accordingly.

The ink jet ink compositions of the present invention can comprise a colorant such as water soluble or dispersible dyes including anionic and cationic dyes. Those dyes can be Basic, Acid, Anionic, Direct, Cationic, and Reactive dyes. Examples of suitable dyes include, but are not limited to, Food dyes including Food Black No. 1, Food Black No. 2, Food Red No. 40, Food Blue No. 1, Food Yellow No. 7, and the like; FD & C dyes; Acid Black dyes (Nos. 1, 7, 9, 24, 26, 48, 52, 58, 60, 61, 63, 92, 107, 109, 118, 119, 131, 140, 155, 156, 172, 194, and the like); Acid Red dyes (No. 1, 8, 32, 35, 37, 52, 57, 92, 115, 119, 154, 249, 254, 256, and the like); Acid Blue dyes (No. 1, 7, 9, 25, 40, 45, 62, 78, 80, 92, 102, 104, 113, 117, 127, 158, 175, 183, 193, 209, and the like); Acid Yellow dyes (No. 3, 7, 17, 19, 23, 25, 29, 38, 42, 49, 59, 61, 72, 73, 114, 128, 151, and the like); Direct Black dyes (No. 4, 14, 17, 22, 27, 38, 51, 112, 117, 154, 168, and the like); Direct Blue dyes (No. 1, 6, 8, 14, 15, 25, 71, 76, 78, 80, 86, 90, 106, 108, 123, 163, 165, 199, 226, and the like); Direct Red dyes (No. 1, 2, 16, 23, 24, 28, 39, 62, 72, 227, 236, and the like); Direct Yellow dyes (No. 4, 11, 12, 27, 28, 33, 34, 39, 50, 58, 86, 100, 106, 107, 118, 127, 132, 142, 157, and the like); anthraquinone dyes; monoazo dyes; diazo dyes; phthalocyanine derivatives, including various phthalocyanine sulfonate and ammonium salts either with or without a metal; aza annulenes; formazan copper complexes; triphenodioxazines; Bernacid Red 2BMN; Pontamine Brilliant Bond Blue A; Pontamine; Cibracron Brilliant Red 38-A (Reactive Red 4), available from Aldrich Chemical Co.; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Direct Brilliant Pink B Ground Crude, available from Crompton & Knowles; Cartasol Yellow GTF Presscake, available from Sandoz, Inc.; Cartasol Yellow GTF Liquid Special 110, available from Sandoz, Inc.; Yellow Shade 16948, available from Tricon; Basacid Black X34 (BASF X-34), available from BASF; Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Concentrate A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; various Reactive dyes, including Reactive Black dyes, Reactive Blue dyes, Reactive Red dyes including Reactive red 180, and Reactive Yellow dyes including Reactive yellow 37; and the like, as well as mixtures thereof.

The pigments can be black, cyan, magenta, yellow, red, blue, green, brown, and the like, as well as mixtures thereof.

Examples of suitable pigments include, but are not limited to, various carbon blacks such as channel black; furnace black; lamp black; Raven® 5250, Raven® 5750, Raven® 3500 and other similar carbon black products available from Columbia Company; Regal® 330, Black Pearl® L, Black Pearl® 1300, and other similar carbon black products available from Cabot Company; Degussa carbon blacks such as Color Black® series, Special Black® series, Printtex® series and Derussol® carbon black dispersions available from Degussa Company; Hostafine® series such as Hostafine® Yellow GR (Pigment 13), Hostafine® Yellow (Pigment 83), Hostafine® Red FRLL (Pigment Red 9), Hostafine® (Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation; Normandy Magenta RD-2400 (Paul Uhlich); Paliogen Violet 5100 (BASF); Paliogen® Violet 5890 (BASF); Permanent Violet VT2645 (Paul Uhlich); Heliogen® Green L8730 (BASF); Argyle Green XP-111-S (Paul Uhlich); Brilliant Green Toner GR 0991 (Paul Uhlich); Heliogen® Blue L6900, L7020 (BASF); Heliogen® Blue D6840, D7080 (BASF); Sudan Blue OS (BASF); PV Fast Blue B2GO1 (American Hoechst); Irgalite Blue BCA (Ciba-Geigy); Paliogen® Blue 6470 (BASF); Sudan III (Matheson, Coleman, Bell); Sudan II (Matheson, Coleman, Bell); Sudan IV (Matheson, Coleman, Bell); Sudan Orange G (Aldrich); Sudan Orange 220 (BASF); Paliogen® Orange 3040 (BASF); Ortho Orange OR 2673 (Paul Uhlich); Paliogen® Yellow 152, 1560 (BASF); Lithol Fast Yellow 0991K (BASF); Paliotol Yellow 1840 (BASF); Novoperm Yellow FG 1 (Hoechst); Permanent Yellow YE 0305 (Paul Uhlich); Lumogen Yellow D0790 (BASF); Suco-Gelb L1250 (BASF); Suco-Yellow D1355 (BASF); Hostaperm Pink E (American Hoechst); Fanal® Pink D4830 (BASF); Cinquasia Magenta (DuPont); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol® Rubine Toner (Paul Uhlich); Lithol® Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen® Red 3340 (BASF); and Lithol® Fast Scarlet L4300 (BASF). Other useful pigments can also be selected. The pigments of the present invention may be stabilized in ink jet compositions by employing a pigment dispersant which can be selected from anionic, cationic, and nonionic pigment dispersants, as well as appropriate mixtures thereof. The pigments of the present invention may also be chemically unmodified pigments or chemically modified pigments which are stabilized by their surface attached functional groups such as carboxylic acid salts, sulfonic acid salts, phosphonic acid salts, and substituted or unsubstituted ammonium salts.

The preferred pigments for the ink jet inks of the present invention are nontoxic and AMES test (a mutagenic test) negative materials that include nonmutagenic and noncarcinogenic pigments for safety reasons. For example, it is often desirable to have dyes and pigments, including carbon blacks and color pigments, that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 part per million and, therefore, the inks derived from such pigments are generally considered to be toxic or failing to pass the AMES test. However, many nontoxic carbon blacks and color pigments including Raven® 5250, Raven® 5750, Regal® 330, Black Pearl® 1300, Black Pearls L, Vulcan® XC-7, Hostapern® pink E, Hostaperm® blue (a phthalocyanine derivative) and other pigments are generally used in toners and other imaging applications. Those carbon blacks and color pigments usually have a polyaromatic hydrocarbon content of less than 1 part per million. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in a thermal ink jet printer. Preferred particle average diameters are generally from about 0.001 to about 10 $\mu$m, although the particle size can be outside these ranges in embodiments. A preferred average pigment particle size in the inks of the present invention includes particles having at least 50% of the particles being below 0.3 $\mu$m with no remaining particles being greater than 3.0 $\mu$m (measured by a Particle Size Analyzer). More preferably, the average pigment particle size includes particles having at least 50% of the particles being below 0.3 $\mu$m with no remaining particles being greater than 1.0–1.2 $\mu$m.

In embodiments of the present invention, the pigment may be dispersed in the ink jet ink composition with one or more dispersants. The dispersants can be anionic, cationic, and nonionic types. Some preferred dispersants are ionic dispersants that have both ionic (capable of ionization in water) and hydrophobic (affinity for pigments) moieties. Suitable dispersants include, but are not limited to, anionic dispersants, including polymers and copolymers of styrene sulfonate salts (such as $Na^+$, $Li^+$, $K^+$, $Cs^+$, $Rb^+$, and $Fr^+$ substituted and unsubstituted ammonium cations, and the like) and naphthalene sulfonate salts, (such as $Na^+$, $Li^+$, $K^+$, $Cs^+$, $Rb$, and $Fr^+$ substituted and unsubstituted ammonium cations, and the like); copolymers of unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, and $Fr^+$, substituted and unsubstituted ammonium cations, and the like) and an aldehyde derivative (such as alkyl aldehyde derivatives including formaldehyde, acetaldehyde, propylaldehyde, and the like). They can be added to an ink jet ink either in solid form or water solutions. Examples of such dispersants include commercial products such as Versa® 4, Versa® 7, Versa® 377 (National Starch and Chemical Co.); Lomar® D (Diamond Shamrock Chemicals Co.); Daxad® 19, Daxad® K (W.R. Grace & Co.); Tamol® SN (Rohm & Haas); and the like. Some of the preferred dispersants comprise naphthalene sulfonate salts, especially a condensation or reaction products of naphthalenesulfonic acid and formaldehyde, and its salts (such as $Na^+$, $Li^+$, $K^+$, $Cs^+$, $Rb^+$, and $Fr^+$, substituted and unsubstituted ammonium cations, and the like). Also, nonionic dispersants or surfactants can be used in ink jet inks of the present invention, such as ethoxylated monoalkyl or dialkyl phenols including Igepal® CA and CO series materials (Rhone-Poulenc Co.); and Triton® series materials (Union Carbide Company). These nonionic surfactants or dispersants can be used alone or in combination with the aforementioned anionic or cationic dispersants. Useful cationic dispersants of the present invention generally comprise substituted and unsubstituted ammonium salts.

The ink jet ink compositions of the present invention may optionally comprise a water soluble or miscible microwave coupler which can be ionic or nonionic type. The nonionic type may include, but not limited to, various alcohol derivatives, hydroxyamide derivatives and their oxyalkylene reaction products which can be used in ink jet inks to couple with the microwave dryer for effective drying of images on papers and the reduction of smear and inter-color bleed.

Those hydroxyamide derivatives and their condensation products with alkyleneoxides (oxyalkylenes) can function as humectants, anti-curl agents, and/or microwave couplers. They can be used in ink jet inks either with or without an ionic type microwave coupler.

The ionic type microwave coupler can be selected from an organic or inorganic salt that allows an ink to be dried quickly by a microwave-heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device. These ionic compounds typically include metal and ammonium salts of inorganic and organic acids with cations and anions. Typical cations of salts include, but are not limited to, $H^+$, $NH_4$, $Cs^+$, $K^+$, $Na^+$, $Li^+$, $Fr^+$, $Ca^{+2}$, $Mg^{+2}$, $Zn^{+2}$, $Ni^{+2}$, $Mn^{+2}$, $Co^{+2}$, $Sr^{+2}$, $Cd^{+2}$, $Ba^{+2}$, $Fe^{+2}$, $Cu^{+2}$, $Ga^{+3}$, $In^{+3}$, $Cr^{+3}$, $Pr^{+3}$, $Nd^{+3}$, $Y^{+3}$, $Al^{+3}$, $Fe^{+2}$, cations, and the like. The anions of those salts include, but are not limited to, inorganic and organic anions such as $I^-$, $Br^-$, $Cl^-$, $F^-$, $OH^-$, $NO_3^-$, $SO_4^{2-}$, $CH_3CO_{2-}$, $CH_3CH_2CO_2-$, $C_6H_5CO_{2-}$, $C_6H_5SO_{3-}$, various ethylenediaminetetraacetic acid (EDTA) anions, and the like. salts of monovalent and multivalent salts can also be used in ink jet inks for reduction of intercolor bleed (bleed near the border of two different inks) either through microwave heating of the images or chemical interaction with anionic type colorants (e.g., anionic dyes, pigments stabilized with anionic dispersants, pigments with an anionic functional group on the pigment particles surface, and the like) in a multi-color ink jet printing process.

The use of those ammonium and metal salts are desirable when they are compatible with optional ink components or ingredients of the present invention including water, hydroxyamide derivatives, sulfur-containing humectants such as thioglycols, sulfoxides, and sulfones, or other humectants including glycol derivatives, polyethyleneglycols, polypropyleneglycols, and the like, colorants including dyes and pigments, and other ink additives. They are chosen so that they will not cause a latency or a jetting problem, especially for a high-resolution printhead. In embodiments of the present invention, the metal and ammonium salts of inorganic and organic acids with ionizable cations and anions in aqueous inks can be included in the ink jet ink compositions in an amount of from about 0 to about 10% by weight of total ink weight, and preferably in an amount of from about 0 to about 5% by weight of total ink weight, although they can be outside this range.

The ink jet inks of the present invention may optionally include a jetting aid such as polyethyleneoxide. A preferred polyethyleneoxide is one having a weight-average molecular weight of about 18,500 at a concentration of about 0.001–1.0% by weight of inks, and preferably a concentration of less than 0.6% by weight. The jetting aid provides smooth jetting or jetting with low jitter.

Other desired chemical additives including surfactants, water soluble polymers, pH buffers, biocides, chelating agents (EDTA and the like), and other known additives can also be optionally used in inks of the present invention. Such additives can generally be added to ink jet ink compositions of the present invention in known amounts for their known purpose.

Surfactants or wetting agents can be added to the ink to control ink wetting and surface tension. These additives may be of the anionic or cationic or nonionic types. Suitable surfactants and wetting agents include, but are not limited to, Tamol SN®, Tamol LG®, and those of the Triton® series (Rohm and Haas Co.); those of the Marasperse® series; those of the Igepal® series (Rhone-Poulenc Co., formerly from GAF Co.); those of the Brij® Series (ICI America Inc.) including Brij® 30, Bri® 35, Bri® 52, Brij® 56, Bri® 58, Bri® 72, Brij® 76, Brij® 78, Bri® 92, Bri® 96, and Brij® 98; those of Surfynol® Series (Air Product Co.); those of the Tergitole series (Union Carbide Co.); those of the Duponol® series (E.I. Du Pont de Nemours & Co.), sodium lauryl sulfate; sodium dodecyl sulfate; sodium octyl sulfate; Emulphor® ON 870 and ON 877 (GAF); Igepal® Series (Rhone-Poulenc Co.) surfactants including Igepal® CO-630, Igepal® CO-530, Igepal® CA-630, and Igepal® CA-530; and the like; as well as other commercially available surfactants. These surfactants and wetting agents may be present in the inks in effective amounts, generally from 0 to about 8 percent by weight of total ink weight, and preferably from about 0 to about 6 percent by weight of total ink weight, and more preferably from about 0 to about 4 percent by weight of total ink weight, although the amount can be outside these ranges.

Polymeric chemical additives can also be added to the ink jet inks of the present invention to enhance the viscosity of the ink or smear resistance. Suitable polymeric additives include, but are not limited to, water soluble polymers such as Gum Arabic, hydroxypropylcellulose, hydroxyethylcellulose, polyvinylpyrrolidinone, polyvinylether, starch, polysaccharides, polyethyleneimines being derivatized with ethylene oxide and propylene oxide, such as the Discole® series (DKS International); the Jeffamine® series (Texaco); and the like. Polymeric additives may be present in the ink jet inks of the present invention in amounts of from 0 to about 10 percent by weight of total ink weight, preferably from about 0.001 to about 8 percent by weight of total ink weight, and more preferably from about 0.001 to about 4 percent by weight of total ink weight, although the amount can be outside these ranges.

Other optional additives for the ink jet ink compositions of the present invention include biocides such as Dowicil 150, 200, and 75, benzoate salts, sorbate salts, Proxcel® (available from ICI), and the like. When used in inks, such biocides are generally present in an amount of from 0 to about 10 percent by weight of total ink weight, preferably from about 0.001 to about 8 percent by weight of total ink weight, and more preferably from about 0.01 to about 4.0 percent by weight of total ink weight, although the amount can be outside these ranges.

Ink jet ink compositions of the present invention may also include pH controlling agents or pH buffering agents. Suitable pH controlling agents include, but are not limited to, acids, bases, phosphate salts, carboxylate salts, inner salts with cation and anion in a molecule, sulfite salts, amine salts, and the like. When used in inks, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

Other suitable chemical additives are chelating agents including EDTA (ethylene diamine tetraacetic acid), HEEDTA N-(hydroxyethyl)ethylenediaminetetracetate), NTA (nitrolacetate), DTPA (diethylenetriaminepentaacetic acid), and the like, as well as their salts, typically present in an amount of from 0.001 to about 10 percent by weight of total ink weight and preferably from 0.001 to 5 percent by weight of total ink weight, although the amount can be outside of these ranges.

The ink jet ink compositions of the present invention possess good jetting performance and frequency when a high resolution printhead is employed (e.g. 300 spi., 400 spi, 600 spi, 720 spi, 800 spi, 1420 spi, etc.). This would allow an ink jet ink composition to be jetted easily and requires less frequent ink spitting or printhead maintenance.

In addition, the ink jet ink compositions of the present invention can have excellent long-term jetting stability (e.g., jetting greater than $1 \times 10^7$ drops), thus, allowing the printhead or printbars to be used for a long period of time. This reduces the cost of ink jet printing operation and maintenance. The use of ink jet ink compositions of the present invention also provides the capability of a fast speed ink jet printing (e.g., more than 50 pages per minute of multi-color ink jet printing process) especially when partial-width or full-width array printheads are employed. The capability of fast speed multi-color ink jet printing of the present invention far exceeds that of the current state-of-the-art commercial multi-color ink jet printers.

The ink jet printing of the inks of the present invention can be carried out in a checkerboard or image-wise single pass method (ink jet printing process).

Some ink jet printers such as desktop printers employ mobile printhead(s). A mobile printhead typically comprises a plurality of closely arranged nozzles provided in a small printing area. Such a mobile printhead produces partial digital images (e.g., checkerboard printing method), which when combined form large recognizable images, by sliding along a guide and dispersing ink during each "pass" across a print substrate.

This type of ink jet printer usually is a slow speed desk top ink jet printer that is available in the current market. The mobile printhead may also comprise two or more butted printheads (i.e., a partial-width printhead with increasing number of ink nozzles comprising, e.g., more than 384 nozzles per printhead) such as the one employed in a partial-width array ink jet printer so that more ink can be delivered to a substrate in a single swath as it moves across the print substrate. This type of partial-width ink jet printer will have a higher ink jet printing speed as compared to the aforementioned desktop ink jet printer with a single printhead per ink cartridge. In a multi-color ink jet printer, several printheads (e.g., black, cyan, magenta, and yellow) and their corresponding inks can be optionally mounted on a printhead holder and moved across the print substrate. Different color inks are dispersed onto a print substrate when they are moved relative to the print substrate or vice versa. Each color ink can also have its own dedicated printhead and cartridge in an ink jet printer.

Multi-color ink jet image can be obtained by repeated printing. Multi-color ink jet printing process using the partial-width printheads (e.g., black, cyan, magenta, and yellow printheads with their corresponding inks) increases the printing speed of the checkerboard printing process.

Other faster ink jet printing process such as a single pass ink jet printing or full-width array ink jet printing process employs a full-width array printhead comprising a plurality of closely arranged nozzles and ejectors arranged across a width of a print substrate (an array of butted printheads extended to the width of a print substrate; for example, it can comprise more than several thousand ink jet nozzles per printhead). These nozzles can disperse ink without several time consuming passes of the printhead across the print substrate. The full-width array ink jet printheads are usually stationary in the printing process while the print substrate is passing through the printheads. Many known full-with array ink jet printheads, processes, and their applications are described in U.S. Pat. Nos. 5,057,854; 4,985,710; 5,098,503; 5,192,959; and 5,432,539; the entire disclosures of which are incorporated herein by reference. The ink jet inks of the present invention can be employed in conjunction with a heater or dryer (e.g., a microwave dryer or device) to perform ink jet printing at a high speed (e.g., at least up to 50 pages per minutes) to produce high quality multi-color images on plain or coated papers or transparencies without smear or inadequate drying.

In another embodiment of the present invention, the print substrate used for printing the inks of the present invention in an ink jet printing process can be optionally heated at any stage of ink jet printing including before, during, or after printing as well as combinations thereof. The print substrate and inks can be optionally heated by various means (or devices) including, but not limited to, radiant heater, electric resistor, heating tape, hot plate, hot roller, heated belt, microwave device, heated platen, radiation including heated lamp and desired light sources, heated drum and hot air. In a multi-color ink jet printing process of the present invention which involves a set of at least four inks (e.g. comprising black, cyan, magenta, and yellow inks), the image of the first printing ink (e.g., black ink, or yellow ink, or magenta ink, or cyan ink) can be dried on the surface of the print substrate before the deposition of other inks near the border of the "first ink". Alternatively, printing can be carried out by different inks and optionally heated by one or more heating devices at any stage of ink jet printing including before, during, or after printing as well as combinations thereof.. The ink jet inks can be dried quickly by a heater (e.g. a microwave dryer, radiant heater, heated platen, heated roller, etc.) to give excellent full color images without undesired smear or inter-color bleed.

The ink jet inks of the present invention may be applied to a suitable print substrate in an image-wise fashion (e.g., using full-width array printheads). Application of the ink of the present invention to the print substrate can be made by any suitable printing process compatible with ink jet ink compositions, such as continuous stream ink jet printing process, drop-on-demand ink jet printing process (including piezoelectric, acoustic, and thermal ink jet printing processes), and the like.

The print substrate employed in the present invention can be any substrate compatible with aqueous-based inks, including, but not limited to, plain papers, such as Xerox® series 10, Xerox® 4024, Japanese papers, HP Bright White, office papers, Recycled Bond paper, Domtar, Comwall-Ontario, Xerox Image Series LX, Hammermill Tidal DP, International Paper Selma, Al., Xerox 4024 DP, Rank Xerox, Premier ECF, Rank Xerox Premier TCF, Champion Brazil paper, Rank Xerox Business, Aussedat-Rey, Rank Xerox Exclusive, Rank Xerox Premier TCF, Nymolla, Xerox 4024, Cascade Xerographic paper, Spectrum DP, Husky Xerocopy, Xerox Image Elite, Fuji Xerox Paper, ink jet papers, commercial bond papers, and the like; coated papers (or special ink jet papers), such as those available from Hewlett-Packard, Canon, Oji Paper Co., and Xerox Corporation; and ink jet transparency materials suitable for aqueous inks or ink jet printing processes including those from Artright Co., Hewlett-Packard, Asahi Glass Co., Canon Co., and Xerox Corporation. Textile and other substrates can also be used as a print substrate if it is desired.

Aqueous ink jet inks of the present invention provide numerous benefits including low printing cost, high image resolution, excellent print quality on a variety of substrates, excellent jetting capability with good drop velocity, long latency, good drop mass or drop volume that provide optimal optical density, high frequency response to allow for high speed and high resolution printing, good printhead recoverability and maintainability, excellent ink jetting stability, and no undesired printhead kogation.

The ink jet ink compositions of the present invention can dry very fast to avoid inter-color bleed on plain papers either with or without a heating device. The ink jet ink compositions also can have reduced curl property. In addition, the ink jet ink compositions can be jetted at high speed with partial-width ink jet printhead or full-width array ink jet printheads or printbars to give black or color images at a speed of up to 50 pages per minute.

Specific embodiments of the present invention will now be described in detail. These Examples are intended to be illustrative only, and the invention is not limited to the materials, conditions or process parameters set forth in these embodiments. All parts and percentages are by weight in inks, unless otherwise indicated. Other embodiments and modifications of the present invention may occur to those skilled in the art subsequent to a review of the information presented herein; these embodiments and modifications, as well as equivalents thereof, are also included within the scope of the present invention.

EXAMPLE 1

A yellow ink ("Y1") was prepared, comprising 20% PROJET Yellow 1G dye solution, 15% Acid Yellow dye solution, 10% Dipropyleneglycol, 11% Dowanol TPM, 0.65% TRIS, 0.35% EDTA, 0.05% PEO (Ave. MW=18.5K), 0.1% Dowicil 150, and water for balance. The Y1 yellow ink was also used as a reference or control ink for the intercolor bleed study.

EXAMPLE 2

A yellow ink ("Y2") was prepared, comprising 20% PROJET Yellow 1G dye solution, 15% Acid Yellow dye solution, 10% Dipropyleneglycol, 11% Dowanol TPM, 0.65% TRIS, 0.35% EDTA, 0.05% PEO (MW=18.5K), 0.1% Dowicil 150, 0.3% FC-129 Fluorad {A mixture of water and Glycine, N-ethyl-N-[(heptadecafluorooctyl)sulfonyl]-, potassium salt (CAS Registration No. 2991-51-7); Glycine, N-ethyl-N-[(tridecafluorohexyl)sulfonyl]-, potassium salt (CAS Registration No. 67584-53-6); Glycine, N-ethyl-N-[(nonafluorobutyl)sulfonyl]-, potassium salt (CAS Registration No. 67584-51-4); Glycine, N-ethyl-N-[(pentadecafluoroheptyl)sulfonyl]-, potassium salt (CAS Registration No. 67584-62-7); and Glycine, N-ethyl-N-[(undecafluoropentyl) sulfonyl]-, potassium salt (CAS Registration No. 67584-52-5); 3M Co.}, and water for balance. This low surface tension ink dries faster than the Y1 control ink on print substrates such as plain and coated papers without undesired smear, and gives uniform solid area on papers and ink jet transparencies without mottle. It is an example of the present invention.

EXAMPLE 3

A carbon black ink ("B1") was prepared comprising 15.79% Sulfolane (Philips), 15.69% Cabot Chemically Modified Carbon Black Dispersion (Cab-O-Jet® 300, Lot #IJ70401-02), 7.72% 2-Pyrrolidinone, 2.94% polyether-polymethyl-siloxan copolymer solution (Lot #23023 Goldschmit Chemical Co.), 0.71% Latex solution (BzMa/EtgMa/Ma 55:21:24), 0.05% polyethyleneoxide (PEO), and water for balance.

EXAMPLE 4

The B1 black ink was printed on papers next to either the Y1 yellow ink (control) or the Y2 yellow ink for an inter-color bleed study, using a Xerox XJ6C printer in Auto/Graphic/Vivid color/Normal modes. The printing, either multiple pass or checkerboard ink jet printing processes, was carried out at room temperature on Champion Brazil, Japanese Yamayuri paper, HP Bright White, and Xerox Xpressions papers. The MFLEN number for the inter-color bleed was obtained by an equipment consisting of a personal computer, an illuminating light source, a filter, and an imaging microscope with a CDD sensor. The equipment was calibrated with a standard image (line with sharp edges). Software using a Fourier Transform technique was used to calculate the MFLEN data and line width. Lower MFLEN numbers indicate better image quality. The smaller MFLEN number is desirable because it shows sharper line image.

The average inter-color bleed MFLEN data (Ave. ICB) were obtained for horizontal and vertical lines. The results are shown in Table I below. The results indicate that the Y2 yellow ink, of the present invention, has better print quality (low ICB data) than the control Y1 yellow ink.

TABLE I

Inter-color Bleed MFLEN Data For Printing B1 Ink Next to Y1 and Y2 Inks

| Paper | Carbon Black Ink (B1) next to Y1 Yellow Ink Avg. MFLEN (Horizontal) B1/Y1 | Carbon Black Ink (B1) Next to Y2 Yellow Ink* Avg. MFLEN (Horizontal) B1/Y2 | Carbon Black Ink (B1) Next to Y1 Yellow Ink Avg. MFLEN (Vertical) B1/Y1 | Carbon Black Ink (B1) Next to Y2 Yellow Ink* Avg. MFLEN (Vertical) B1/Y2 |
|---|---|---|---|---|
| Xerox Xpressions | 3.2 | 2.8 | 15.8 | 8.7 |
| HP Bright White | 13.5 | 10.4 | 14.8 | 12.9 |
| Champion Brazil | 17.4 | 17.9 | 48.2 | 28.9 |
| Japanese Yamayuri | 51.6 | 37.7 | 36.9 | 24.9 |
| Average ICB | 21.4 | 17.2 | 28.9 | 18.9 |

EQUIVALENTS

Those skilled in the art will recognize, or be able to ascertain using no more than routine experimentation, numerous equivalents to the specific procedures described herein. Such equivalents are considered to be within the scope of the present invention and are covered by the following claims. The contents of all references, issued patents, and published patent applications cited throughout this application are hereby incorporated by reference. The appropriate components, processes, and methods of those patents, applications and other documents may be selected for the present invention and embodiments thereof.

What is claimed is:

1. An ink jet ink composition comprising water, a colorant of dye or pigment, or a mixture of dye and pigment, and a water-soluble or ink-compatible anti-intercolor bleed agent represented by formula (I):

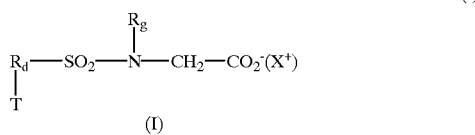

Formula (I)

wherein
- a) $R_d$ is selected from the group consisting of $C_1$ to $C_{30}$ alkyl, cyclic alkyl ($C_3$ to $C_{30}$), phenyl, napthyl, and aromatic groups either with or without the presence of a nitrogen or oxygen atom, and the required substituents of each carbon atom of said $R_d$ group are independently selected from the group consisting of hydrogen (H) and fluorine (F) atoms;
- b) $R_g$ is selected from the group consisting of $C_1$ to $C_{30}$ alkyl, cyclic alkyl ($C_3$ to $C_{30}$), and aromatic ($\geq C_5$) groups either with or without the presence of a nitrogen or oxygen atom, and the substituents of each carbon atom of said $R_g$ group are independently selected from the group consisting of hydrogen (H) and fluorine (F) atoms;
- c) T is selected from the group consisting of $C_1$ to $C_{30}$ alkyl and cyclic alkyl ($C_3$ to $C_{30}$) groups either with or without the presence of a nitrogen or oxygen atom, and the substituents of each carbon atom of said T group are independently selected from the group consisting of hydrogen (H) and fluorine (F) atoms; and
- d) ($X^+$) is a cation selected from the group consisting of a hydrogen cation; a monovalent metal cation; a multivalent metal cation; and an ammonium group of the general formula

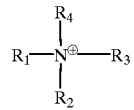

wherein $R_1$, $R_2$, $R_3$, and $R_4$ are independently selected from the group consisting of hydrogen, alkyl group, hydroxyalkyl groups, hydroxyl terminated polyalkyleneoxides, and a group comprising one or more alkyleneoxide moieties terminated with hydrogen, amine, hydroxyl, or alkyl group;

wherein the water-soluble or ink-compatible bleed agent is present in a concentration between about 0.3% to about 0.8% by weight of the ink jet ink composition.

2. The ink jet ink composition of claim 1, wherein formula (I) further includes the materials of glycine acids and salts in their corresponding nonionic forms without a negative charge on said carboxylate group and a positive charge on said $X^+$ group consists of metals or ammonium groups.

3. The ink jet ink composition of claim 1 wherein said water-soluble or ink-compatible anti-intercolor bleed agent comprises an N-(perfluoroalkyl sulfonyl), N-(alkyl), glycine salt.

4. The ink jet ink composition of claim 1 further comprising a humectant and an optional additive selected from the group consisting of biocides, pH buffering agents, chelating agents, jetting aids, anti-bleed agents, water soluble polymers, agents, anti-curling agents, anti-cockle agents, penetrants, dispersants, surfactants, wetting agents, microwave couplers, and combinations thereof.

5. An ink jet ink printing process comprising the application of at least one ink jet ink composition according to claim 4 onto an optionally heated print substrate with an ink jet printhead in any desired ink sequence and pattern in a single pass or a multiple pass method according to digital signals.

6. The ink jet printing process of claim 5, wherein said ink jet ink printing process is conducted by at least an ink jet printhead selected from the group consisting of a single printhead, a partial-width printhead and a full-width array printhead.

7. The ink jet printing process of claim 6, wherein said ink jet printhead has a resolution which is equal to or greater than 300 spi.

8. An ink jet printing process comprises printing a "first ink" of an ink jet ink composition comprising water, a colorant of dye or pigment, or a mixture of dye and pigment, and a water-soluble or ink-compatible anti-intercolor bleed agent represented by formula (I):

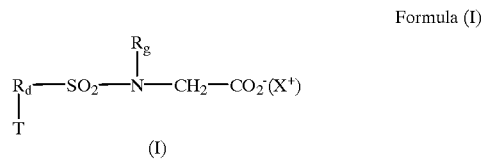

Formula (I)

wherein
- a) $R_d$ is selected from the group consisting of $C_1$ to $C_{30}$ alkyl, cyclic alkyl ($C_3$ to $C_{30}$), phenyl, napthyl, and aromatic groups either with or without the presence of a nitrogen or oxygen atom, and the required substituents of each carbon atom of said $R_d$ group are independently selected from the group consisting of hydrogen (H) and fluorine (F) atoms;
- b) $R_g$ is selected from the group consisting of $C_1$ to $C_{30}$ alkyl, cyclic alkyl ($C_3$ to $C_{30}$), and aromatic ($\geq C_5$) groups either with or without the presence of a nitrogen or oxygen atom, and the substituents of each carbon atom of said $R_g$ group are independently selected from the group consisting of hydrogen (H) and fluorine (F) atoms;
- c) T is selected from the group consisting of $C_1$ to $C_{30}$ alkyl and cyclic alkyl ($C_3$ to $C_{30}$) groups either with or without the presence of a nitrogen or oxygen atom, and the substituents of each carbon atom of said T group are independently selected from the group consisting of hydrogen (H) and fluorine (F) atoms; and
- d) ($X^+$) is a cation selected from the group consisting of a hydrogen cation, a monovalent metal; a multivalent metal cation; and an ammonium group of the general formula

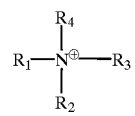

wherein $R_1$, $R_2$, $R_3$, and $R_4$ are independently selected from the group consisting of hydrogen, alkyl group, hydroxyalkyl groups, hydroxyl terminated polyalkyleneoxides, and a group comprising one or more alkyleneoxide moieties terminated with hydrogen, amine, hydroxyl, or alkyl group;

wherein the water-soluble or ink-compatible bleed agent is present in a concentration between about 0.3% to about 0.8% by weight of the ink jet ink composition;

wherein said ink jet ink composition further comprises a humectant and an optional additive selected from the group consisting of biocides, pH buffering agents, chelating agents, jetting aids, anti-bleed agents, water soluble polymers, agents, anti-curling agents, anti-cockle agents, penetrants, dispersants, surfactants, wetting agents, microwave couplers, and combinations thereof, onto a heated or unheated substrate next to a "second ink" which has a surface tension of 22–72 dynes/cm.

9. The ink jet printing process of claim 8 wherein the said "first ink" is a color dye-based or pigment-based ink and the said "second ink" is a black dye ink or a carbon black ink either with or without the chemically modified carbon black particles.

10. The ink jet printing process of claim 9 wherein said color dye-based or pigment-based ink ("first ink") has a surface tension of $\geq 45$ dynes/cm and the said black dye ink or carbon black ink ("second ink") has a surface tension of >45 dynes/cm.

11. An ink jet printing process comprising printing a "first ink" which is a black dye ink or a carbon black ink either with or without chemically modified carbon black particles and a "second ink" which is a color dye-based or pigment-based ink that has an ink jet ink composition comprising water, a colorant of dye or pigment, or a mixture of dye and pigment, and a water-soluble or ink-compatible anti-intercolor bleed agent represented by formula (I):

Formula (I)

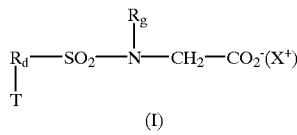

(I)

wherein a) $R_d$ is selected from the group consisting of $C_1$ to $C_{30}$ alkyl, cyclic alkyl ($C_3$ to $C_{30}$), phenyl, napthyl, and aromatic groups either with or without the presence of a nitrogen or oxygen atom, and the required substituents of each carbon atom of said $R_d$ group are independently selected from the group consisting of hydrogen (H) and fluorine (F) atoms;

b) $R_g$ is selected from the group consisting of $C_1$ to $C_{30}$ alkyl, cyclic alkyl ($C_3$ to $C_{30}$), and aromatic ($\geq C_5$) groups either with or without the presence of a nitrogen or oxygen atom, and the substituents of each carbon atom of said $R_g$ group are independently selected from the group consisting of hydrogen (H) and fluorine (F) atoms;

c) T is selected from the group consisting of $C_1$ to $C_{30}$ alkyl and cyclic alkyl ($C_3$ to $C_{30}$) groups either with or without the presence of a nitrogen or oxygen atom, and the substituents of each carbon atom of said T group are independently selected from the group consisting of hydrogen (H) and fluorine (F) atoms; and d) ($X^+$) is a cation selected from the group consisting of a hydrogen cation, a monovalent metal; a multivalent metal cation; and an ammonium group of the general formula

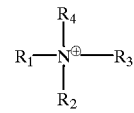

wherein $R_1$, $R_2$, $R_3$, and $R_4$ are independently selected from the group consisting of hydrogen, alkyl group, hydroxyalkyl groups, hydroxyl terminated polyalkyleneoxides, and a group comprising one or more alkyleneoxide moieties terminated with hydrogen, amine, hydroxyl, or alkyl group;

wherein the water-soluble or ink-compatible bleed agent is present in a concentration between about 0.3% to about 0.8% by weight of the ink jet ink composition;

wherein said ink jet ink composition further comprises a humectant and an optional additive selected from the group consisting of biocides, pH buffering agents, chelating agents, jetting aids, anti-bleed agents, water soluble polymers, agents, anti-curling agents, anti-cockle agents, penetrants, dispersants, surfactants, wetting agents, microwave couplers, and combinations thereof.

12. A multi-color ink jet printing process comprising printing a set of four or more multi-color ink jet inks by their corresponding printheads in any desired printing method and sequence of said multi-color ink jet inks according to digital data signals onto a print substrate, wherein said set of four or more multi-color ink jet inks has at least one ink jet ink having an ink jet ink composition comprising water, a colorant of dye or pigment, or a mixture of dye and pigment, and a water-soluble or ink-compatible anti-intercolor bleed agent represented by formula (I):

Formula (I)

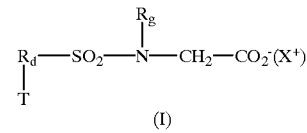

(I)

wherein a) $R_d$ is selected from the group consisting of $C_1$ to $C_{30}$ alkyl, cyclic alkyl ($C_3$ to $C_{30}$), phenyl, napthyl, and aromatic groups either with or without the presence of a nitrogen or oxygen atom, and the required substituents of each carbon atom of said $R_d$ group are independently selected from the group consisting of hydrogen (H) and fluorine (F) atoms;

b) $R_g$ is selected from the group consisting of $C_1$ to $C_{30}$ alkyl, cyclic alkyl ($C_3$ to $C_{30}$), and aromatic ($\geq C_5$) groups either with or without the presence of a nitrogen or oxygen atom, and the substituents of each carbon atom of said $R_g$ group are independently selected from the group consisting of hydrogen (H) and fluorine (F) atoms;

c) T is selected from the group consisting of $C_1$ to $C_{30}$ alkyl and cyclic alkyl ($C_3$ to $C_{30}$) groups either with or without the presence of a nitrogen or oxygen atom, and the substituents of each carbon atom of said T group are independently selected from the group consisting of hydrogen (H) and fluorine (F) atoms; and d) ($X^+$) is a cation selected from the group consisting of a hydrogen cation, a monovalent metal; a multivalent metal cation; and an ammonium group of the general formula

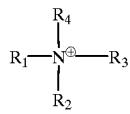

wherein $R_1$, $R_2$, $R_3$, and $R_4$ are independently selected from the group consisting of hydrogen, alkyl group, hydroxyalkyl groups, hydroxyl terminated polyalkyleneoxides, and a group comprising one or more alkyleneoxide moieties terminated with hydrogen, amine, hydroxyl, or alkyl group;

wherein the water-soluble or ink-compatible bleed agent is present in a concentration between about 0.3% to about 0.8% by weight of the ink jet ink composition.

13. The multi-color ink jet printing process of claim 12, wherein said printheads are selected from the group consisting of single printheads, partial-width printheads, and full-width array printheads, and said printing method is carried out by either a multiple pass method (checkerboard printing method) or a single pass method with a printing speed up to at least as high as 50 pages per minute.

14. The multi-color ink jet printing process of claim 12, wherein said print substrate is optionally heated by a heating device at any stage of an ink jet printing process said stage being selected from the group consisting of before said printing process, during said printing process, after said printing process, and any combination of stages of said printing process.

15. The multi-color ink jet printing process of claim 14, wherein said heating device is selected from the group consisting of a radiant heater, a heated roller, a heated platen, a heated drum, a heating belt, a microwave drying device, a heated lamp, hot air, and combinations thereof.

16. The multi-color ink jet ink printing process of claim 12, wherein said printing method is selected from the group consisting of continuous ink jet printing process and drop-on-demand ink jet printing process wherein said drop-on demand ink jet printing process is selected from the group consisting of thermal, piezoelectric, and acoustic ink jet printing processes.

17. The multi-color ink jet printing process of claim 13, wherein said sequence is selected from the group consisting of a) K(Black), C(Cyan), M(Magenta), Y(Yellow); b) K, C, Y, M; c) K, M, C, Y; d) K, M, Y, C; e) K, Y, C, M; f) K, Y, M, C; g) Y, C, M, K; h) Y, M, C, K; i) Y, C, K, M; j) Y, M, K, C; k) Y, K, C, M; l) Y, K, M, C; m) C, Y, M, K; n) C, Y, K, M; o) C, M, Y, K; p) C, M, K, Y; q) C, K, M, Y; r) C, K, Y, M; s) M, Y, C, K; t) M, Y, K, C; u) M, C, Y, K; w) M, C, K, Y; x) M, K, Y, C; and z) M, K, C, Y.

18. The multi-color ink jet printing process of claim 17, wherein said sequence is preferred to be selected from the group consisting of a); c); g); and h).

19. An ink jet ink composition comprising water, a colorant of a dye or pigment, or a mixture of dye and pigment, and a water-soluble or ink-compatible anti-intercolor bleed agent which is a metal or ammonium salt of a glycine material selected from the group consisting of Glycine, N-methyl-N-[(heptadecafluorooctyl)sulfonyl]-, salts; Glycine, N-ethyl-N-[(heptadecafluorooctyl)sulfonyl]-, salts; Glycine, N-cyclohexyl-N-[(heptadecafluorooctyl)sulfonyl]-, salts; Glycine, N-ethyl-N-[(tridecafluorohexyl)sulfonyl]-, salts; Glycine, N-propyl-N-[(tridecafluorohexyl)sulfonyl]-, salts; Glycine, N-ethyl-N-[(nonafluorobutyl)sulfonyl]-, salts; Glycine, N-ethyl-N-[(pentadecafluoroheptyl)sulfonyl]-, salts; Glycine, N-ethyl-N-[(undecafluoropentyl)sulfonyl]-, salts; Glycine, N-pentafluoroethyl-N-[(heptadecafluorooctyl)sulfonyl]-, salts; Glycine, N-pentafluoroethyl-N-[(tridecafluorohexyl)sulfonyl]-, salts; Glycine, N-pentafluoroethyl-N-[(nonafluorobutyl)sulfonyl]-, salts; Glycine, N-pentafluoroethyl-N-[(pentadecafluoroheptyl)sulfonyl]-, salts; Glycine, N-pentafluoroethyl-N-[(undecafluoropentyl)sulfonyl]-, salts; Glycine, N-ethyl-N-[(tridecafluorohexyl)sulfonyl]-, salts; Glycine, N-propyl-N-[(tridecafluorohexyl)sulfonyl]-, salts; Glycine, N-ethyl-N-[(nonafluorobutyl)sulfonyl]-, salts; Glycine, N-ethyl-N-[(pentadecafluoroheptyl)sulfonyl]-, salts; Glycine, N-ethyl-N-[(undecafluoropentyl)sulfonyl]-, salts; Glycine, N-pentafluoroethyl-N-[(heptadecafluorooctyl)sulfonyl]-, salts; Glycine, N-pentafluorophenyl-N-[(tridecafluorohexyl)sulfonyl]-, salts; Glycine, N-perfluorotolyl-N-[(nonafluorobutyl)sulfonyl]-, salts; Glycine, N-perfluoroethyl-N-[(pentadecafluoroheptyl)sulfonyl]-, salts; Glycine, N-perfluorohexyl-N-[(perfluoropentyl)sulfonyl]-, salts; Glycine, N-perfluorooctyl-N-[(hexyl)sulfonyl]-, salts; Glycine, N-perfluorooctyl-N-[(perfluorohexyl)sulfonyl]-, salts; Glycine, N-perfluoroethyl-N-[(perfluorocyclohexyl)sulfonyl]-, salts; Glycine, N-perfluorohexyl-N-[(perfluoroethylcyclopentyl)sulfonyl]-, salts; Glycine, N-perfluorooctyl-N-[(perfluoromethylhexyl)sulfonyl]-, salts; Glycine, N-phenyl-N-[(perfluorohexyl)sulfonyl]-, salts; and Glycine, N-(4-methylphenyl)-N-[(perfluorohexyl)sulfonyl]-, salts; and mixtures thereof;

wherein the water-soluble or ink-compatible bleed agent is present in a concentration between about 0.3% to about 0.8% by weight of the ink jet ink composition.

20. An ink jet ink composition comprising water, a colorant of a dye or pigment, or a mixture of dye and pigment, and a water-soluble or ink-compatible anti-intercolor bleed agent which is a glycine material selected from the group consisting of polyethyleneglycol ester of N-methyl-N-[(heptadecafluorooctyl)sulfonyl]Glycine; polyethyleneglycol ester of N-ethyl-N-[(heptadecafluorooctyl)sulfonyl]Glycine; polyethyleneglycol ester of N-cyclohexyl-N-[(heptadecafluorooctyl)sulfonyl]Glycine; polypropyleneglycol ester of N-ethyl-N-[(tridecafluorohexyl)sulfonyl]Glycine; polyethyleneglycol ester of N-propyl-N-[(tridecafluorohexyl)sulfonyl]Glycine; poly(ethyleneglycol-co-propyleneglycol) ester of N-ethyl-N-[(nonafluorobutyl)sulfonyl]Glycine; polyethyleneglycol ester of N-ethyl-N-[(pentadecafluoroheptyl)sulfonyl]Glycine; polyethyleneglycol ester of N-ethyl-N-[(undecafluoropentyl)sulfonyl]Glycine; polyethyleneglycol ester of N-pentafluoroethyl-N-[(heptadecafluorooctyl)sulfonyl]Glycine; polyethyleneglycol ester of N-pentafluoroethyl-N-[(tridecafluorohexyl)sulfonyl]Glycine; polyethyleneglycol ester of N-pentafluoroethyl-N-[(nonafluorobutyl)sulfonyl]Glycine; polypropyleneglycol ester of N-pentafluoroethyl-N-[(pentadecafluoroheptyl)sulfonyl]Glycine; polyethyleneglycol ester of N-pentafluoroethyl-N-[(undecafluoropentyl)sulfonyl]Glycine; polyethyleneglycol ester of N-ethyl-N-[(tridecafluorohexyl)sulfonyl]Glycine; polyethyleneglycol ester of N-propyl-N-[(tridecafluorohexyl)sulfonyl]Glycine; polyethyleneglycol ester of N-ethyl-N-[(nonafluorobutyl)sulfonyl]Glycine; polyethyleneglycol ester of N-ethyl-N-[(pentadecafluoroheptyl)sulfonyl]Glycine; polypropyleneglycol ester of N-ethyl-N-[(undecafluoropentyl)sulfonyl]Glycine; polyethyleneglycol ester of N-pentafluoroethyl-N-

[(heptadecafluorooctyl)sulfonyl]Glycine; polyethyleneglycol ester of N-pentafluorophenyl-N-[(tridecafluorohexyl)sulfonyl]Glycine; polyethyleneglycol ester of N-perfluorotolyl-N-[(nonafluorobutyl)sulfonyl]Glycine; polyethyleneglycol ester of N-perfluoroethyl-N-[(pentadecafluoroheptyl)sulfonyl]Glycine; polyethyleneglycol ester of N-perfluorohexyl-N-[(perfluoropentyl)sulfonyl]Glycine; polyethyleneglycol ester of N-perfluorooctyl-N-[(hexyl)sulfonyl]Glycine; polyethyleneglycol ester of N-perfluorooctyl-N-[(perfluorohexyl)sulfonyl]Glycine; polyethyleneglycol ester of N-perfluoroethyl-N-[(perfluorocyclohexyl)sulfonyl]Glycine; polyethyleneglycol ester of N-perfluorohexyl-N-[(perfluoroethylcyclopentyl)sulfonyl]Glycine; polyethyleneglycol ester of N-perfluorooctyl-N-[(perfluoromethylhexyl)sulfonyl]Glycine; polyethyleneglycol ester of N-phenyl-N-[(perfluorohexy)sulfonyl]Glycine; and polyethyleneglycol ester of N-(4-methylphenyl)-N-[(perfluorohexyl)sulfonyl]Glycine; and mixtures thereof.

21. An ink jet ink composition comprising water, a colorant of a dye or a pigment, or a mixture of dye and pigment, and a water-soluble or ink-compatible anti-intercolor bleed agent which is a metal or an ammonium salt of glycine material selected from the group consisting of N-(fluoroalkyl sulfonyl), N-(alkyl), glycine salts, N-(fluorocycloalkyl sulfonyl), N-(alkyl), glycine salts, N-(alkylsulfonyl), N-(fluoroalkyl), glycine salts, N-(cycloalkylsulfonyl), N-(fluoroalkyl), glycine salts, N-(fluoroalkyl sulfonyl), N-(fluoroalkyl), glycine salts, N-(fluorocycloalkyl sulfonyl), N-(fluoroalkyl), glycine salts, and N-(fluoroalkyl sulfonyl), N-(fluorocycloalkyl), glycine salts;

wherein the water-soluble or ink-compatible bleed agent is present in a concentration between about 0.3% to about 0.8% by weight of the ink jet ink composition.

22. The ink jet ink composition of claim 19, further comprising a humectant and an optional additive selected from the group consisting of biocides, pH buffering agents, chelating agents, jetting aids, anti-bleed agents, water soluble polymers, agents, anti-curling agents, anti-cockle agents, penetrants, dispersants, surfactants, wetting agents, microwave couplers, and combinations thereof.

23. The ink jet ink composition of claim 22, wherein said humectant is selected from the group consisting of glycols selected from the group consisting of ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, and polypropylene glycol; diols selected from the group consisting of 1,3-propanediol, 1,4-butanediol, 1,4-pentanediol, 1,5-pentanediol, 1,5-hexanediol, and 1,6-hexanediol; triols selected from the group consisting of glycerine, trimethylolpropane, 1,3,5-triols selected from the group consisting of 1,3,5-pentanetriol and 1,3,5-hexanetriol, and 1,2,5-triols selected from the group consisting of 1,2,5-pentanetriol and 1,2,5-hexanetriol; reaction products of all aforementioned glycols, diols, and triols with alkylethyleneoxides selected from the group consisting of ethyleneoxide and propyleneoxide; sulfoxides and sulfones selected from the group consisting of sulfolane, dimethylsulfone, and dimethylsulfoxide; amides selected from the group consisting of 2-pyrrolidinone, N-methylpyrrolidinone, N-hydroxyethylpyrrolidinone, N-hydroxyamides selected from the group consisting of N-acetylethanolamine, N-acetylpropanolamine, N,N-dimethylforamide, N-methylacetamide, N,N-dimethylacetamide, and caprolactam; ureas; inner salts consisting of betaines; ethers consisting of glycol ethers consisting of carbitols selected from the group consisting of butylcarbitol and cellusolve; polyglycolether derivatives; carboxylic acids and salts; alcohols selected from the group consisting of n-hexanol, n-pentanol, n-butanol, n-propanol, isopropanol, ethanol, and methanol; thio derivatives of the aforementioned hydroxyl containing compounds; amino alcohols; isomers of all the aforementioned materials; and their mixtures thereof.

24. The ink jet ink composition of claim 21, said ink jet ink composition further comprising a humectant selected from the group consisting of glycols selected from the group consisting of ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, and polypropylene glycol; diols selected from the group consisting of 1,3-propanediol, 1,4-butanediol, 1,4-pentanediol, 1,5-pentanediol, 1,5-hexanediol, and 1,6-hexanediol; triols selected from the group consisting of glycerine, trimethylolpropane, 1,3,5-triols selected from the group consisting of 1,3,5-pentanetriol and 1,3,5-hexanetriol, and 1,2,5-triols selected from the group consisting of 1,2,5-pentanetriol and 1,2,5-hexanetriol; reaction products of all aforementioned glycols, diols, and triols with alkylethyleneoxides selected from the group consisting of ethyleneoxide and propyleneoxide; sulfoxides and sulfones selected from the group consisting of sulfolane, dimethylsulfone, and dimethylsulfoxide; amides selected from the group consisting of 2-pyrrolidinone, N-methylpyrrolidinone, N-hydroxyethylpyrrolidinone, N-hydroxyamides selected from the group consisting of N-acetylethanolamine, N-acetylpropanolamine, N,N-dimethylforamide, N-methylacetamide, N,N-dimethylacetamide, and caprolactam; ureas; inner salts consisting of betaines; ethers consisting of glycol ethers consisting of carbitols selected from the group consisting of butylcarbitol and cellusolve; polyglycolether derivatives; carboxylic acids and salts; alcohols selected from the group consisting of n-hexanol, n-pentanol, n-butanol, n-propanol, isopropanol, ethanol, and methanol; thio derivatives of the aforementioned hydroxyl containing compounds; amino alcohols; isomers of all the aforementioned materials; and their mixtures thereof.

25. The ink jet ink composition of claim 21, said ink jet ink composition further comprising a humectant selected from the group consisting of glycols selected from the group consisting of ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, and polypropylene glycol; diols selected from the group consisting of 1,3-propanediol, 1,4-butanediol, 1,4-pentanediol, 1,5-pentanediol, 1,5-hexanediol, and 1,6-hexanediol; triols selected from the group consisting of glycerine, trimethylolpropane, 1,3,5-triols selected from the group consisting of 1,3,5-pentanetriol and 1,3,5-hexanetriol, and 1,2,5-triols selected from the group consisting of 1,2,5-pentanetriol and 1,2,5-hexanetriol; reaction products of all aforementioned glycols, diols, and triols with alkylethyleneoxides selected from the group consisting of ethyleneoxide and propyleneoxide; sulfoxides and sulfones selected from the group consisting of sulfolane, dimethylsulfone, and dimethylsulfoxide; amides selected from the group consisting of 2-pyrrolidinone, N-methylpyrrolidinone, N-hydroxyethylpyrrolidinone, N-hydroxyamides selected from the group consisting of N-acetylethanolamine, N-acetylpropanolamine, N,N-dimethylforamide, N-methylacetamide, N,N-dimethylacetamide, and caprolactam; ureas; inner salts consisting of betaines; ethers consisting of glycol ethers consisting of carbitols selected from the group consisting of butylcarbitol and cellusolve; polyglycolether derivatives; carboxylic acids and salts; alcohols selected from the group consisting of n-hexanol, n-pentanol, n-butanol, n-propanol, isopropanol, ethanol, and methanol; thio derivatives of the aforementioned hydroxyl containing compounds; amino alcohols; isomers of all the aforementioned materials; and their mixtures thereof.

26. The ink jet ink composition of claim 4, said humectant selected from the group consisting of glycols selected from the group consisting of ethylene glycol, propylene glycol, diethylene glycol, dipropylene glycol, triethyleneglycol, tetraethyleneglycol, pentaethyleneglycol, polyethylene glycol, tripropyleneglycol, tetrapropyleneglycol, and polypropylene glycol; diols selected from the group consisting of 1,3-propanediol, 1,4-butanediol, 1,4-pentanediol, 1,5-pentanediol, 1,5-hexanediol, and 1,6-hexanediol; triols selected from the group consisting of glycerine, trimethylolpropane, 1,3,5-triols selected from the group consisting of 1,3,5-pentanetriol and 1,3,5-hexanetriol, and 1,2,5-triols selected from the group consisting of 1,2,5-pentanetriol and 1,2,5-hexanetriol; reaction products of all aforementioned glycols, diols, and triols with alkylethyleneoxides selected from the group consisting of ethyleneoxide and propyleneoxide; sulfoxides and sulfones selected from the group consisting of sulfolane, dimethylsulfone, and dimethylsulfoxide; amides selected from the group consisting of 2-pyrrolidinone, N-methylpyrrolidinone, N-hydroxyethylpyrrolidinone, N-hydroxyamides selected from the group consisting of N-acetylethanolamine, N-acetylpropanolamine, N,N-dimethylforamide, N-methylacetamide, N,N-dimethylacetamide, and caprolactam; ureas; inner salts consisting of betaines; ethers consisting of glycol ethers consisting of carbitols selected from the group consisting of butylcarbitol and cellusolve; polyglycolether derivatives; carboxylic acids and salts; alcohols selected from the group consisting of n-hexanol, n-pentanol, n-butanol, n-propanol, isopropanol, ethanol, and methanol; thio derivatives of the aforementioned hydroxyl containing compounds; amino alcohols; isomers of all the aforementioned materials; and their mixtures thereof.

27. The ink jet ink composition of the claim 4 wherein said ink jet ink composition comprises a colorant of dye which is selected from the group consisting of anionic dyes, acid dyes, direct dyes, basic dyes, and reactive dyes.

28. The ink jet ink composition of claim 1 wherein the monovalent metal cation X is selected from the group consisting of $Li^+$, $Na^+$, $Rb^+$, $Cs^+$, $Fr^+$, and $Ag^+$.

29. The ink jet ink composition of claim 1, wherein the multivalent cation X is selected from the group consisting of $Ca^{++}$, $Mg^{++}$, $Zn^{++}$, $Ba^{++}$, $Fe^{++}$, $Sn^{++}$, $Sr^{++}$, $Cd^{++}$, $Cu^{++}$, and $Co^{++}$.

\* \* \* \* \*